United States Patent
Song et al.

(10) Patent No.: US 12,556,840 B2
(45) Date of Patent: Feb. 17, 2026

(54) IMAGE SENSOR

(71) Applicant: Samsung Electronics Co., Ltd., Suwon-si (KR)

(72) Inventors: Hyunseok Song, Suwon-si (KR); Boseong Kim, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 159 days.

(21) Appl. No.: 18/609,154

(22) Filed: Mar. 19, 2024

(65) Prior Publication Data
US 2024/0323566 A1 Sep. 26, 2024

(30) Foreign Application Priority Data
Mar. 24, 2023 (KR) ................. 10-2023-0039201

(51) Int. Cl.
*H04N 25/77* (2023.01)
*H10F 39/18* (2025.01)

(52) U.S. Cl.
CPC .................. *H04N 25/77* (2023.01)

(58) Field of Classification Search
CPC ........ H04N 25/70; H04N 25/77; H10F 39/18; H10F 39/199; H10F 39/802; H10F 39/805; H10F 39/8053; H10F 39/8063; H10F 39/807
See application file for complete search history.

(56) References Cited

U.S. PATENT DOCUMENTS

| | | | |
|---|---|---|---|
| 10,304,975 B2 | 5/2019 | Lee | |
| 10,930,687 B2 | 2/2021 | Byun | |
| 12,154,928 B2* | 11/2024 | Oh | ........................ H10F 39/807 |
| 2015/0255495 A1* | 9/2015 | Park | ..................... H10F 39/186 |
| | | | 257/432 |
| 2018/0130834 A1* | 5/2018 | Lee | ........................ H10F 39/807 |
| 2018/0197904 A1* | 7/2018 | Oh | ........................ H10F 39/199 |
| 2021/0327930 A1* | 10/2021 | Lim | ..................... H10F 39/199 |
| 2022/0093665 A1 | 3/2022 | Park et al. | |
| 2022/0109015 A1 | 4/2022 | Jung et al. | |
| 2022/0123033 A1 | 4/2022 | Park et al. | |
| 2022/0173139 A1 | 6/2022 | Lee et al. | |

(Continued)

FOREIGN PATENT DOCUMENTS

| | | |
|---|---|---|
| JP | 2020-188267 A | 11/2020 |
| KR | 10-2016-0017623 A | 2/2016 |

(Continued)

*Primary Examiner* — Marly S Camargo
(74) *Attorney, Agent, or Firm* — Harness, Dickey & Pierce, P.L.C.

(57) ABSTRACT

An image sensor includes a substrate having a first surface and a second surface opposite to each other in a first direction, and a pixel array including a plurality of pixels arranged in a second direction perpendicular to the first direction and a third direction perpendicular to the second direction. The pixel array includes a first pixel and a second pixel adjacent to the first pixel. Each of the first pixel and the second pixel is inside the substrate and includes a pair of photodiodes. The first pixel includes a first pixel interior separation layer between the pair of photodiodes and extending in the first direction. The second pixel includes a second pixel interior separation layer between the pair of photodiodes and extending in the first direction.

20 Claims, 25 Drawing Sheets

(56) References Cited

U.S. PATENT DOCUMENTS

2022/0190007 A1 6/2022 Kim et al.
2022/0344389 A1 10/2022 Pyo et al.

FOREIGN PATENT DOCUMENTS

| KR | 10-2018-0085394 A | 7/2018 |
| KR | 10-2019-0012806 A | 2/2019 |
| KR | 10-2022-0051052 A | 4/2022 |
| KR | 10-2022-0075096 A | 6/2022 |
| KR | 10-2022-0086732 A | 6/2022 |
| KR | 10-2022-0145442 A | 10/2022 |

* cited by examiner

IMAGE SENSOR

CROSS-REFERENCE TO RELATED APPLICATION

This application is based on and claims priority under 35 U.S.C. § 119 to Korean Patent Application No. 10-2023-0039201, filed on Mar. 24, 2023, in the Korean Intellectual Property Office, the disclosure of which is incorporated by reference herein in its entirety.

BACKGROUND

Example embodiments of inventive concepts relate to an image sensor, and more particularly, to an image sensor including a device isolation layer.

Image sensors that capture an image and convert the captured image into an electrical signal are used in digital cameras, mobile phone cameras, and cameras to be mounted on general consumer electronic devices such as portable camcorders, automobiles, security devices, and robots.

Recently, auto focusing (AF) that automatically detects a focus of an image sensor has been widely used. In particular, various studies have been conducted into phase difference auto focusing (PAF) technology according to characteristics of fast focus detection speed. In PAF, light transmitted through an imaging lens is split and detected in different focus detection pixels, and a focal length is adjusted by automatically driving a focusing lens so that detection signals have the same intensity at the same phase.

SUMMARY

Example embodiments of inventive concepts provide an image sensor in which a vertical length of a pixel interior separation layer varies according to a position of a pixel.

Example embodiments of inventive concepts provide an image sensor including a substrate having a first surface and a second surface opposite to each other in a first direction, and a pixel array including a plurality of pixels arranged in a second direction perpendicular to the first direction and a third direction perpendicular to the second direction, wherein the pixel array includes a first pixel and a second pixel adjacent to the first pixel, each of the first pixel and the second pixel being inside the substrate and including a pair of photodiodes, the first pixel includes a first pixel interior separation layer between the pair of photodiodes and extending in the first direction, the second pixel includes a second pixel interior separation layer between the pair of photodiodes and extending in the first direction, and a length of the second pixel interior separation layer in the first direction is greater than a length of the first pixel interior separation layer in the first direction.

Example embodiments of inventive concepts provide an image sensor including a substrate having a first surface and a second surface opposite to each other in a first direction, the substrate including a pixel array including a plurality of pixels arranged in a second direction perpendicular to the first direction and a third direction perpendicular to the second direction, wherein the pixel array includes a first pixel close to a central portion of the first surface of the substrate and a second pixel farther away from the central portion of the first surface of the substrate than the first pixel, the first pixel includes a first pixel interior separation layer extending in the first direction and a pair of first photodiodes with the first pixel interior separation layer therebetween, the second pixel includes a second pixel interior separation layer extending in the first direction and a pair of second photodiodes with the second pixel interior separation layer therebetween, and a length of the second pixel interior separation layer in the first direction is greater than a length of the first pixel interior separation layer in the first direction.

Example embodiments of inventive concepts provide an image sensor including a substrate having a first surface and a second surface facing each other in a first direction, a center pixel provided inside the substrate and including a pair of photodiodes, a first pixel adjacent to the center pixel and a second pixel farther away from the center pixel than the first pixel, a plurality of microlenses disposed on the first surface of the substrate to correspond to the first pixel and the second pixel, respectively, a first device isolation layer between the first pixel and the second pixel and defining the first pixel and the second pixel, a pair of second device isolation layers extending from the first device isolation layer into the first pixel and the second pixel in a second direction perpendicular to the first direction and facing each other, and a color filter between the plurality of microlenses and the first surface of the substrate, wherein the first pixel includes a first pixel interior separation layer between the pair of photodiodes and extending in the first direction, the second pixel includes a second pixel interior separation layer between the pair of photodiodes and extending in the first direction, a length of the second pixel interior separation layer in the first direction is greater than a length of the first pixel interior separation layer in the first direction, and a width of the first pixel interior separation layer in a third direction perpendicular to the second direction is less than a width of the second device isolation layer in the third direction.

BRIEF DESCRIPTION OF THE DRAWINGS

Example embodiments will be more clearly understood from the following detailed description taken in conjunction with the accompanying drawings in which.

DETAILED DESCRIPTION

Hereinafter, example embodiments will be described in detail with reference to the accompanying drawings. However, the inventive concepts do not have to be configured as limited to the example embodiments described below and may be embodied in various forms. The following example embodiments are not provided to fully complete the inventive concepts, but rather to fully convey the scope of the inventive concepts to those of ordinary skill in the art.

As described herein, an element that is "on" another element may be above or beneath or adjacent (e.g., horizontally adjacent) to the other element. An element that is on another element may be directly on the other element, such that the element is in direct contact with the other element. An element that is on another element may be indirectly on the other element, such that the element is isolated from direct contact with the other element by one or more interposing spaces and/or structures.

It will be understood that elements and/or properties thereof (e.g., structures, surfaces, directions, or the like), which may be referred to as being "perpendicular," "parallel," "coplanar," or the like with regard to other elements and/or properties thereof (e.g., structures, surfaces, directions, or the like) may be "perpendicular," "parallel," "coplanar," or the like or may be "substantially perpendicular," "substantially parallel," "substantially coplanar," respectively, with regard to the other elements and/or properties thereof.

It will be understood that elements and/or properties thereof may be recited herein as being "the same" or "equal" as other elements, and it will be further understood that elements and/or properties thereof recited herein as being "identical" to, "the same" as, or "equal" to other elements may be "identical" to, "the same" as, or "equal" to or "substantially identical" to, "substantially the same" as or "substantially equal" to the other elements and/or properties thereof. Elements and/or properties thereof that are "substantially identical" to, "substantially the same" as or "substantially equal" to other elements and/or properties thereof will be understood to include elements and/or properties thereof that are identical to, the same as, or equal to the other elements and/or properties thereof within manufacturing tolerances and/or material tolerances. Elements and/or properties thereof that are identical or substantially identical to and/or the same or substantially the same as other elements and/or properties thereof may be structurally the same or substantially the same, functionally the same or substantially the same, and/or compositionally the same or substantially the same.

Figure 1:
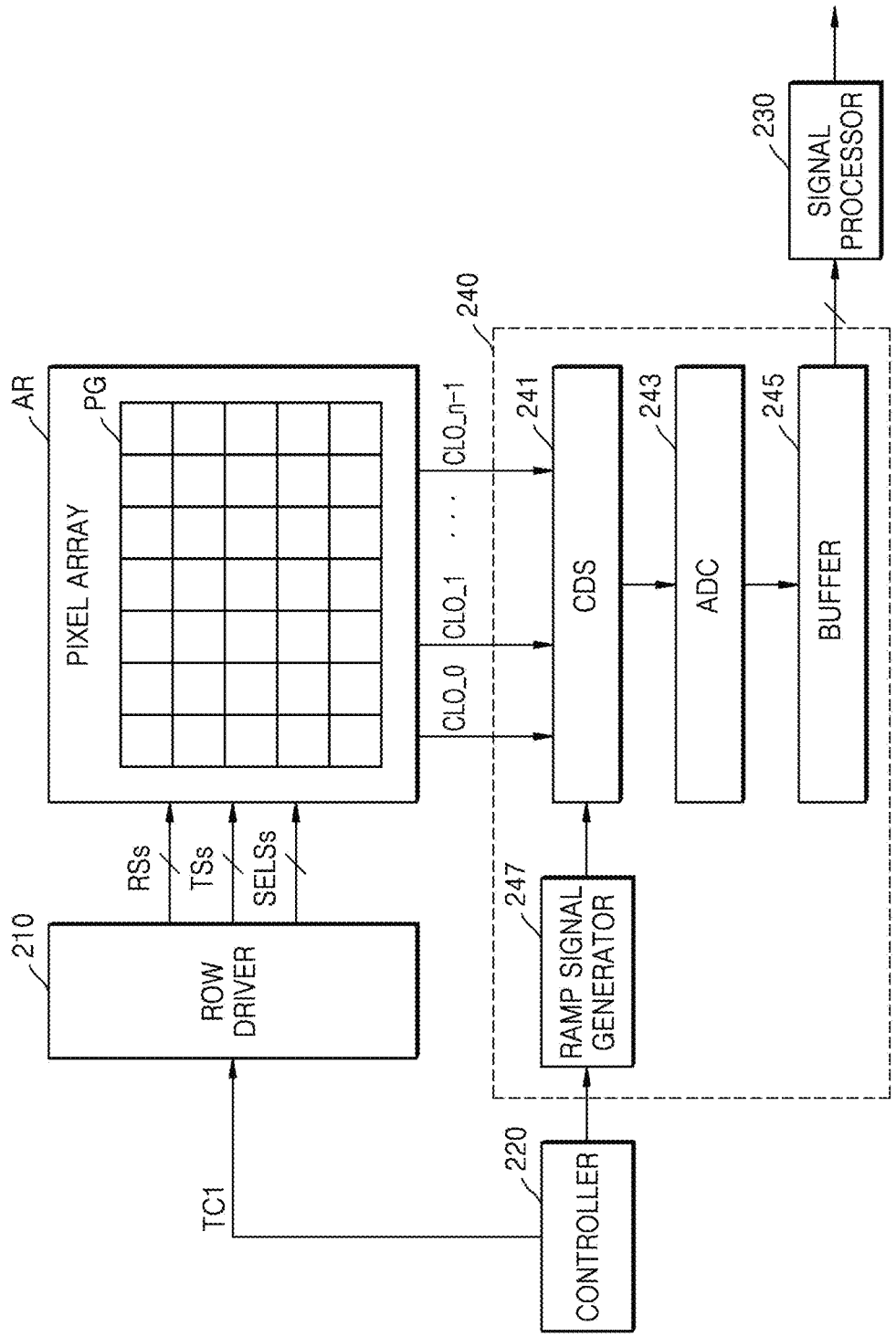
FIG. 1 is a block diagram illustrating a configuration of an image sensor according to an example embodiment.

FIG. 1 is a block diagram illustrating a configuration of an image sensor 10 according to an example embodiment.

Referring to FIG. 1, the image sensor 10 may include a pixel array AR, a controller 220, a signal processor 230, a row driver 210, and a signal reader 240. The signal reader 240 may include a correlated-double sampler (CDS) 241, an analog-to-digital converter (ADC) 243, and a buffer 245.

The pixel array AR may include pixel groups PG. The pixel groups PG may generate image signals corresponding to an object. The pixel array AR may output pixel signals to the CDS 241 through first to $(n-1)^{th}$ column output lines CLO_0 to CLO_n-1 corresponding thereto.

The pixel groups PG may each be defined by a first device isolation layer (see DTI1 of FIG. 4) to be described below. An example of a circuit corresponding to the pixel group PG is described with reference to FIG. 2.

In an example embodiment, the pixel groups PG may each include two pixel areas. Alternatively, in an example embodiment, the pixel groups PG may each include four pixel areas. However, the number of pixel areas included in one pixel group PG may be variously changed. The pixel areas constituting the pixel group PG may each include a photoelectric conversion element and may absorb light and generate photocharges. For example, the photoelectric conversion element may be a photodiode. According to an example embodiment, the pixel group PG of FIG. 1 may correspond to a plurality of pixels PX0, PX1, and PX2 of FIG. 3 to be described below. The pixel areas constituting the pixel group PG may correspond to a plurality of pixel areas PX0a, PX0b, PX1a, PX1b, PX2a, and PX2b illustrated in FIGS. 5, 8, and 10.

The controller 220 may control the row driver 210 so that the pixel array AR absorbs light and accumulates photocharges, or temporarily stores the accumulated photocharges and outputs, to the outside of the pixel array AR, a pixel signal corresponding to the stored photocharges. In addition, the controller 220 may control the signal reader 240 to measure the level of the pixel signal provided by the pixel array AR.

The row driver 210 may generate reset control signals RSs, transmission control signals TSs, and selection signals SELSs for controlling the pixel array AR and may provide the reset control signals RSs, the transmission control signals TSs, and the selection signals SELSs to the pixel groups PG. In an example embodiment, the row driver 210 may determine activation and deactivation timings of the reset control signals RSs, the transmission control signals TSs, and the selection signals SELSs to be provided to the pixel groups PG, based on whether to perform an auto focusing (AF) function or a distance measuring function.

The CDS 241 may sample and hold the pixel signal provided by the pixel array AR. The CDS 241 may perform double sampling on a level of specific noise and a level of the pixel signal and may output a level corresponding to the difference therebetween. In addition, the CDS 241 may receive ramp signals generated by a ramp signal generator 247, may compare the ramp signals with each other, and may output a result of the comparing. The ADC 243 may convert an analog signal corresponding to a level received from the CDS 241 into a digital signal. The buffer 245 may latch the digital signal. The latched digital signal may be sequentially output to the signal processor 230 or the outside of the image sensor 10.

The signal processor 230 may perform signal processing based on the pixel signals received from the pixel groups PG. For example, the signal processor 230 may perform noise reduction processing, gain control, waveform shaping processing, interpolation processing, white balance processing, gamma processing, edge enhancement processing, and the like, but example embodiments are not limited thereto. In addition, the signal processor 230 may output information signal-processed during an AF operation to a processor of an electronic device including the image sensor and may perform a phase difference calculation for the AF operation. In an example embodiment, the signal processor 230 may be included in a processor outside the image sensor 10.

Figure 2:
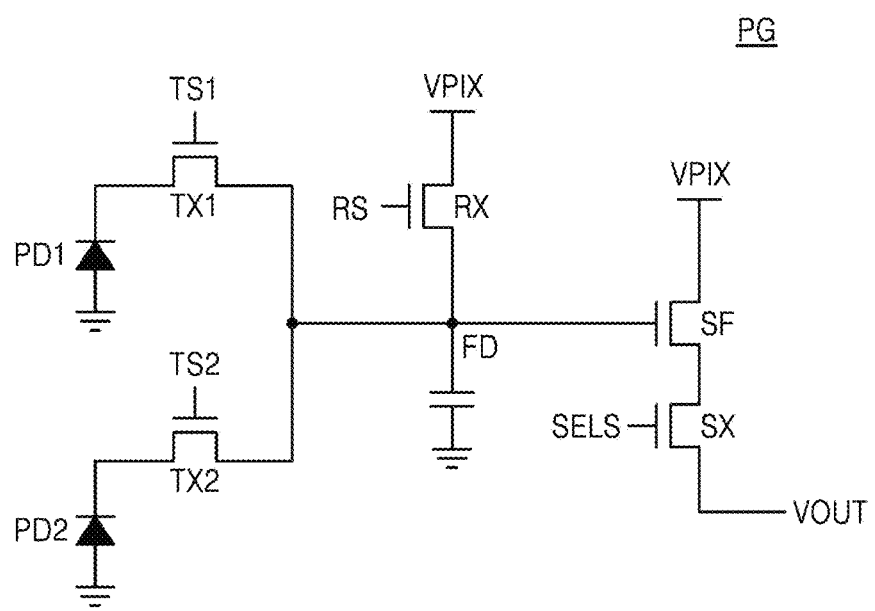
FIG. 2 is a circuit diagram of a pixel group included in a pixel array of FIG. 1.

FIG. 2 is a circuit diagram of the pixel group PG included in the pixel array AR of FIG. 1. Although FIG. 2 illustrates two photodiodes included in one pixel group PG, two or more photodiodes may be included in one pixel group PG.

Referring to FIG. 2, one pixel group PG may include a first photodiode PD1, a second photodiode PD2, a first transfer transistor TX1, a second transfer transistor TX2, a reset transistor RX, an amplification transistor SF, and a selection transistor SX.

The first photodiode PD1 and the second photodiode PD2 may generate photocharges that vary according to the intensity of light. For example, the first photodiode PD1 and the second photodiode PD2 may be P-N junction diodes and may generate electric charges, that is, electrons with negative charges and holes with positive charges, in proportion to the amount of incident light. The photoelectric conversion element may be other photoelectric conversion elements instead of the first photodiode PD1 and the second photodiode PD2. For example, the photoelectric conversion element may be at least one of a phototransistor, a photogate, a pinned photodiode (PPD), and any combination thereof.

The first transfer transistor TX1 may transfer photocharges generated by the first photodiode PD1 to a floating diffusion region FD according to a first transfer control signal TS1, and the second transfer transistor TX2 may transfer photocharges generated by the second photodiode PD2 to the floating diffusion region FD according to a second transfer control signal TS2. When each of the first transfer transistor TX1 and the second transfer transistor TX2 is turned on, the photocharges generated by each of the first photodiode PD1 and the second photodiode PD2 may be transferred to one floating diffusion region FD and may be accumulated and stored in the floating diffusion region FD.

The reset transistor RX may periodically reset electric charges accumulated in the floating diffusion region FD. A drain electrode of the reset transistor RX may be connected to the floating diffusion region FD, and a source electrode of the reset transistor RX may be connected to a power supply voltage VPIX. When the reset transistor RX is turned on in response to the reset control signal RS, the power supply voltage VPIX connected to the source electrode of the reset transistor RX may be transmitted to the floating diffusion region FD. When the reset transistor RX is turned on, the electric charges accumulated in the floating diffusion region FD may be discharged, and thus, the floating diffusion region FD may be reset.

The amplification transistor SF may be controlled according to the amount of photocharges accumulated in the floating diffusion region FD. The amplification transistor SF may act as a buffer amplifier that buffers a signal according to electric charges charged in the floating diffusion region FD. The amplification transistor SF may amplify a potential change in the floating diffusion region FD and may output the amplified potential change to the column output line (one of the column output lines CLO_0 to CLO_n-1) as a pixel signal VOUT.

The selection transistor SX may have a drain terminal connected to a source terminal of the amplification transistor SF and may output the pixel signal VOUT to the CDS 241 through the column output line in response to the selection signal SELS.

Each of the first transfer transistor TX1 and the second transfer transistor TX2 illustrated in FIG. 2 may correspond to a plurality of individual elements 150 illustrated in FIGS. 5 to 23. In addition, the floating diffusion region FD illustrated in FIG. 2 may correspond to a floating diffusion region 140 illustrated in FIGS. 5 to 23.

Figure 3:
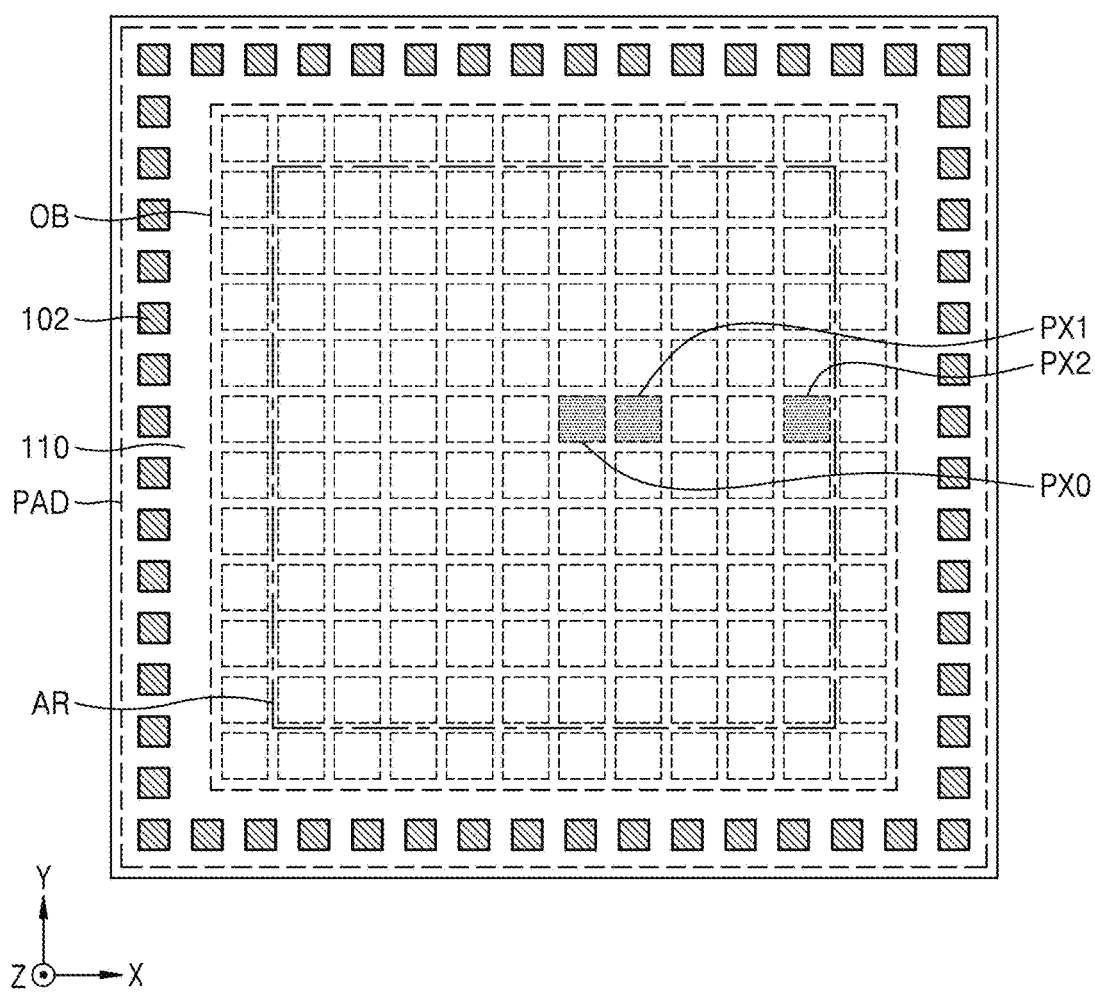
FIG. 3 is a plan view of an image sensor according to an example embodiment.

FIG. 3 is a plan view of an image sensor according to an example embodiment.

Referring to FIG. 3, a substrate 110 may include a pixel array AR, an optical black area OB, and a pad area PAD in a plan view. The pixel array AR may be in the central portion of the substrate 110 in a plan view. The pixel array AR may include a plurality of pixels PX0, PX1, and PX2. The pixels PX0, PX1, and PX2 may each output a photoelectric signal from incident light. The pixels PX0, PX1, and PX2 may form columns and rows and may be arranged two-dimensionally. A first direction (Z direction) may be substantially perpendicular to a first surface (see 111 of FIG. 5) of the substrate 110. The rows may be parallel to a second direction (X direction) perpendicular to the first surface 111 of the substrate 110. The columns may be parallel to a third direction (Y direction). In the present specification, the second direction (X direction) may be parallel to the first surface 111 of the substrate 110. The third direction (Y direction) may be parallel to the first surface 111 of the substrate 110 and perpendicular to the first direction (Z direction). For example, the third direction (Y direction) may be substantially perpendicular to the second direction (X direction).

The pad area PAD is in an edge portion of the substrate 110 and may surround the pixel array AR in a plan view. Pad terminals 102 may be in the pad area PAD. The pad terminals 102 may output electrical signals generated by the pixels PX0, PX1, and PX2 to the outside. Alternatively, external electrical signals or voltages may be transmitted to the pixels PX through the pad terminals 102. Because the pad area PAD is in the edge portion of the substrate 110, the pad terminals 102 may be easily connected to the outside.

The optical black area OB may be between the pixel array AR and the pad area PAD of the substrate 110. The optical black area OB may surround the pixel array AR in a plan view.

Figure 4:
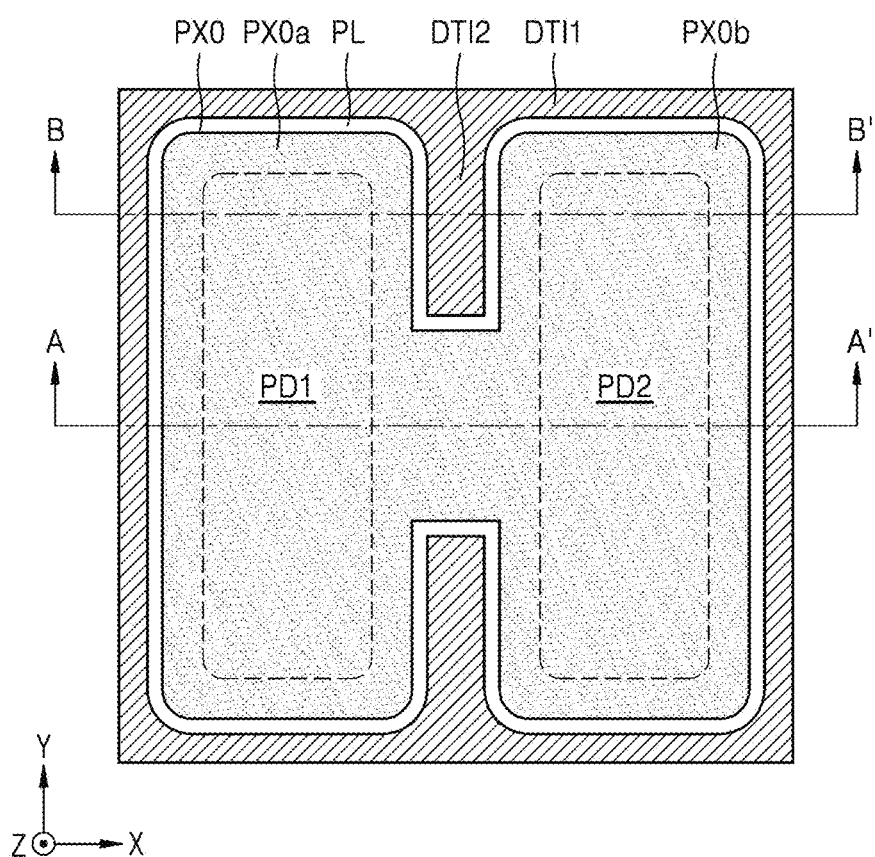
FIG. 4 is a plan view of a center pixel illustrated in FIG. 3.
Figure 5:
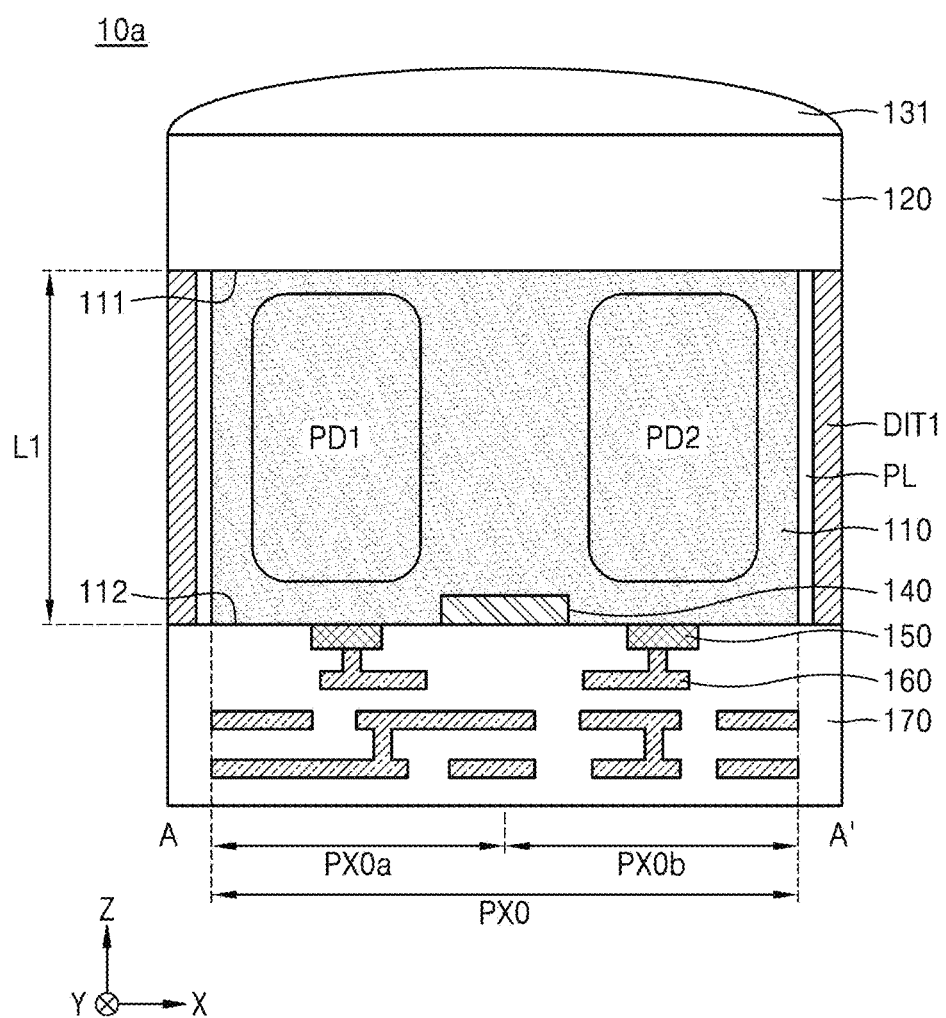
FIG. 5 is a cross-sectional view of the center pixel taken along line A-A' of FIG. 4.
Figure 6:
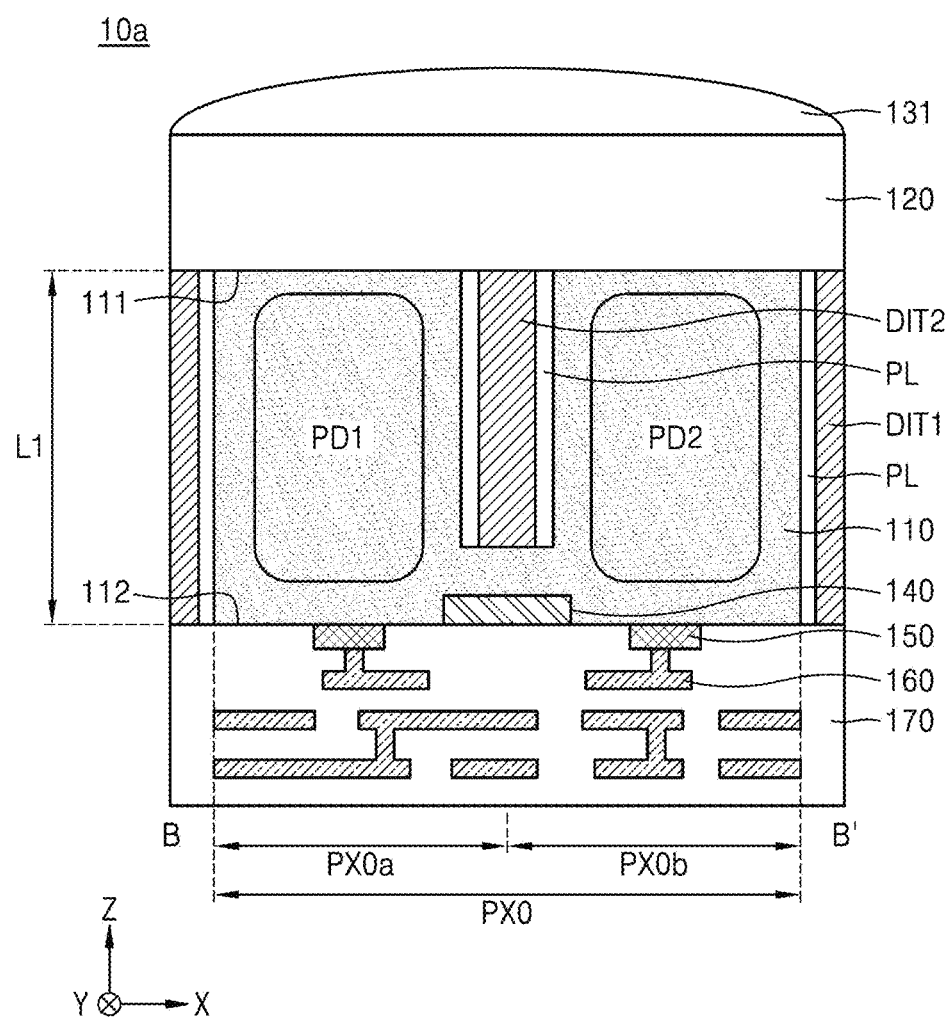
FIG. 6 is a cross-sectional view of the center pixel taken along line B-B' of FIG. 4.

FIG. 4 is a plan view of a center pixel PX0 illustrated in FIG. 3, FIG. 5 is a cross-sectional view of the center pixel PX0 taken along line A-A' of FIG. 4, and FIG. 6 is a cross-sectional view of the center pixel PX0 taken along line B-B' of FIG. 4.

Referring to FIGS. 4, 5, and 6, an image sensor 10a may include a substrate 110 having a first surface 111 and a second surface 112 opposite to each other, a first area PX0a and a second area PX0b of the center pixel PX0 on the substrate 110, and a first device isolation layer DTI1 that separates the center pixel PX0 from other pixels (e.g., a first pixel PX1 and a second pixel PX2) constituting other pixel arrays AR. In addition, the image sensor 10a may include a second device isolation layer DTI2 that separates the first area PX0a of the center pixel PX0 from the second area PX0b of the center pixel PX0.

As illustrated in FIG. 3, the center pixel PX0 may be a pixel arranged adjacent to the central portion of the pixel array AR. In other words, the center pixel PX0 may be a pixel arranged adjacent to the central portion of the first surface 111 of the substrate 110 in a plan view.

The substrate 110 may include, for example, at least one selected from Si, Ge, SiGe, SiC, GaAs, InAs, and/or InP, but example embodiments are not limited thereto. In an example embodiment, the substrate 110 may have a first conductivity type. For example, the first conductivity type may be a p-type. A well region may be further formed in the substrate 110. The well region may be formed by doping the substrate 110 with impurities having a first conductivity type. An impurity concentration of the well region may be greater than an impurity concentration of a region of the substrate 100 other than the well region.

For example, the first surface 111 of the substrate 100 may be a front surface of the substrate 100 and the second surface 112 of the substrate 100 may be a rear surface of the substrate 110. Light may be incident on the first surface 111 of the substrate 110, and pixel circuits may be on the second surface 112 of the substrate 110.

The first area PX0a of the center pixel PX0 and the second area PX0b of the center pixel PX0 may be arranged side-by-side in the second direction (X direction). One photodiode PD1 or PD2 may be formed in each of the first area PX0a of the center pixel PX0 and the second area PX0b of the center pixel PX0. The photodiodes PD1 or PD2 may be arranged in the form of a two-dimensional array in the second direction (X direction) and the third direction (Y direction) within the pixel array (e.g., the pixel array AR of FIG. 1) in a plan view. The first photodiode PD1 and the second photodiode PD2 may receive light of different wavelength bands and generate electric charges.

The first device isolation layer DTI1 and the second device isolation layer DTI2 may be formed in the substrate 100. In an example embodiment, the first device isolation layer DTI1 and the second device isolation layer DTI2 may be formed to extend vertically from the first surface 111 of the substrate 110 toward the second surface 112 of the substrate 110. FIG. 6 illustrates that the first device isolation layer DTI1 and the second device isolation layer DTI2 have a uniform width in the first direction (Z direction), but in some example embodiments, the first device isolation layer DTI1 and the second device isolation layer DTI2 may have a tapered shape in which the width thereof narrows from the first surface 111 of the substrate 110 to the second surface 112 of the substrate 110. However, the image sensor 10a according to the inventive concepts are not limited thereto, and the first device isolation layer DTI1 and the second device isolation layer DTI2 may be formed to extend vertically from the second surface 112 of the substrate 110 toward the first surface 111 of the substrate 110. In this case, the second device isolation layer DTI2 may have a tapered shape in which the width thereof narrows from the second surface 112 of the substrate 110 to the first surface 111 of the substrate 110. The shape and manufacturing process of the first device isolation layer DTI1 and the second device isolation layer DTI2 may be configured in various ways.

The first device isolation layer DTI1 and the second device isolation layer DTI2 may each include an insulating material having a refractive index that is lower than the refractive index of the substrate 110. For example, the first device isolation layer DTI1 and the second device isolation layer DTI2 may each include undoped polysilicon, silicon oxide, silicon nitride, air, or any combination thereof. In an example embodiment, the first device isolation layer DTI1 and the second device isolation layer DTI2 may include the same material as each other.

The first device isolation layer DTI1 and the second device isolation layer DTI2 may respectively refract incident light incident on the first area PX0a of the center pixel PX0 and the second area PX0b of the center pixel PX0. The first device isolation layer DTI1 and the second device isolation layer DTI2 may limit and/or prevent photocharges generated by incident light from moving to an adjacent pixel area due to random drift.

Because the first device isolation layer DTI1 is formed to surround the first area PX0a and the second area PX0b of the center pixel PX0, the first device isolation layer DTI1 may separate the center pixel PX0 from other pixels (e.g., pixels PX1 and PX2) constituting the pixel array AR. That is, one pixel (e.g., the pixel PX1, PX2, or PX3) may be defined by the first device isolation layer DTI1. The first device isolation layer DTI1 may extend in the second direction (X direction) or the third direction (Y direction) and may be formed in a grid shape.

The second device isolation layer DTI2 may be formed to extend in the third direction (Y direction) between the first area PX0a and the second area PX0b of the center pixel PX0. However, this is only an example and example embodiments are limited thereto. Unlike the second device isolation layer DTI2 illustrated in FIG. 4, the second device isolation layer DTI2 may be formed to extend in the second direction (X direction). For example, the first device isolation layer DTI1 and the second device isolation layer DTI2 may be formed to have shapes similar to those obtained by rotating the shapes of the first device isolation layer DTI1 and the second device isolation layer DTI2 illustrated in FIG. 4 by 90 degrees.

The image sensor 10a according to an example embodiment may include a passivation layer PL. The passivation layer PL may be formed to surround the first device isolation layer DTI1 and the second device isolation layer DTI2. The passivation layer PL may also be formed to surround the first area PX0a and the second area PX0b of the center pixel PX0. In an example embodiment, the passivation layer PL may include silicon doped with a first conductivity type, for example, a p-type. Because the passivation layer PL has a conductivity type opposite to that of the first and second areas PX0a and PX0b of the center pixel PX0, a potential barrier may be provided between the first area PX0a and the second area PX0b of the center pixel PX0. That is, the passivation layer PL may form a potential well between the first area PX0a and the second area PX0b of the center pixel PX0.

According to an example embodiment, a first microlens 131 may be on the first surface 111 of the substrate 110. Referring to FIG. 3 together, microlenses may be respectively disposed to correspond to pixels constituting the pixel array AR. The first microlens 131 corresponding to the center pixel PX0 may be on the first surface 111 of the substrate 110. At this time, the upper surface of the first microlens 131 may have an upwardly convex shape. The highest point of the upper surface of the first microlens 131 may be aligned with the central portion of the center pixel PX0 in the first direction (Z direction).

The image sensor 10a according to an example embodiment may include a color filter 120 between the first microlens 131 and the first surface 111 of the substrate 110. In an example embodiment, the color filter 120 may be one of filters that sense red (R), green (G), and blue (B) colors, and the color filter 120 may be disposed to correspond to a Bayer pattern. However, this is only an example and example embodiments are not limited thereto. According to an example embodiment, the pixel array AR may include various types of color filters. For example, the color filter 120 may include filters that sense yellow, cyan, and magenta colors.

The image sensor 10a according to an example embodiment may include a pixel circuit below the first photodiode PD1 and the second photodiode PD2. The pixel circuit may include a plurality of individual elements 150, wiring patterns 160 connected to the individual elements 150, and an insulating layer 170 covering the individual elements 150 and the wiring patterns 160. The pixel circuit may be on the second surface 112 of the substrate 110.

The image sensor 10a according to an example embodiment may include a floating diffusion region 140 formed in the substrate 110. For example, the pixels (see the pixels PX0, PX1, and PX2 of FIG. 3) may each include the floating diffusion region 140 below at least one of the first photodiode PD1 and the second photodiode PD2. The floating diffusion region 140 may be electrically connected to the wiring patterns 160, and the position and area of the floating diffusion region 140 may be variously modified according to some example embodiments.

In a plan view, the center pixel PX0 arranged adjacent to the central portion of the substrate 110 including the pixel array AR may not include a separation layer between the first area PX0a and the second area PX0b of the center pixel PX0, unlike the first pixel PX1 or the second pixel PX2 to be described below.

Figure 7:
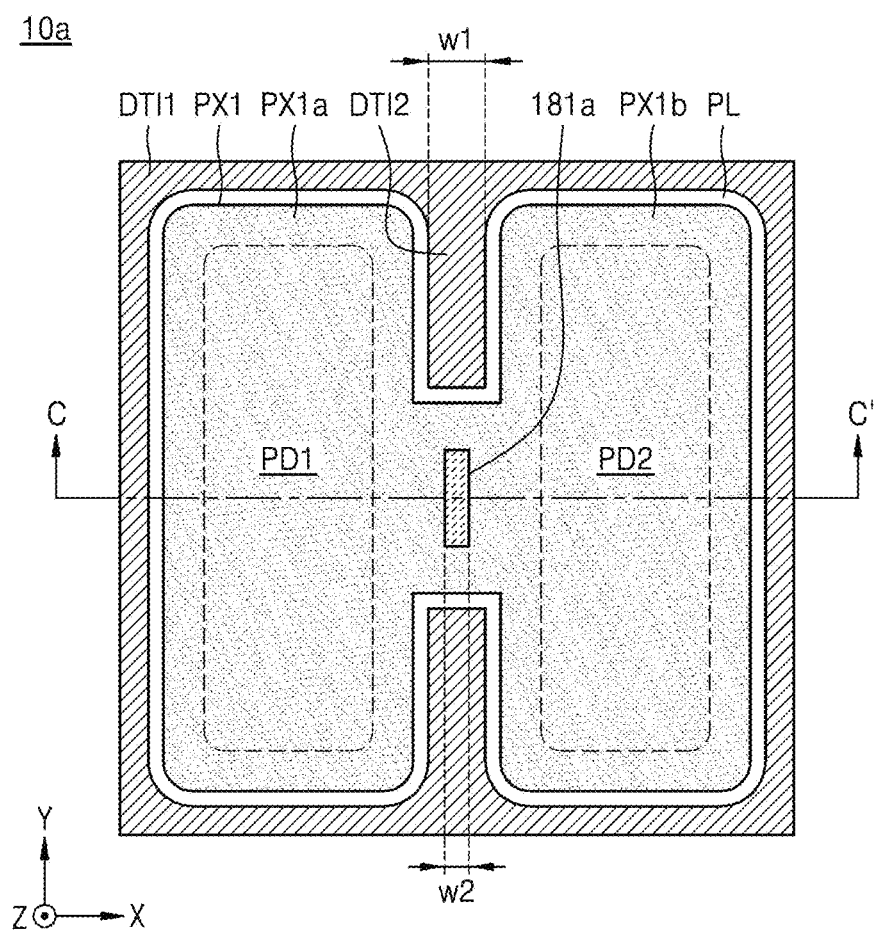
FIG. 7 is a plan view of a first pixel illustrated in FIG. 3.
Figure 8:
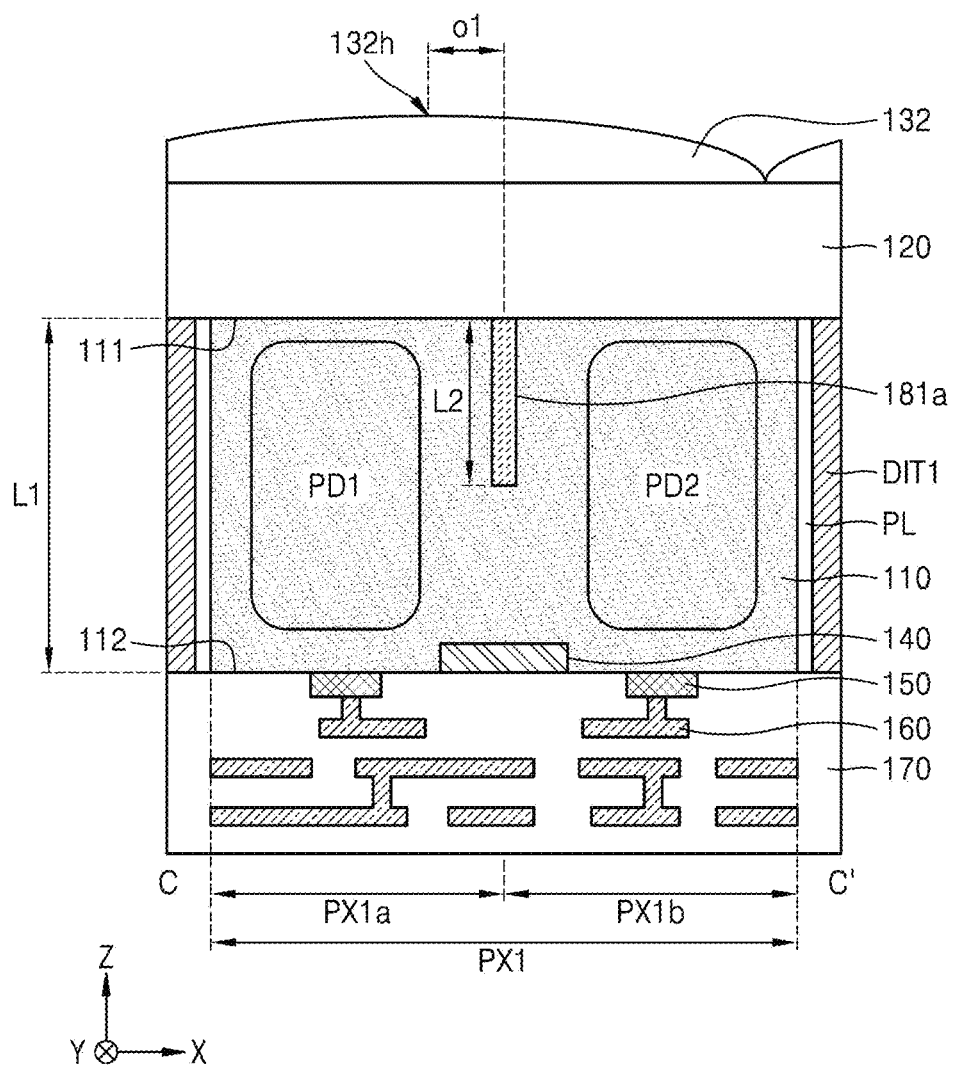
FIG. 8 is a cross-sectional view of the first pixel taken along line C-C' of FIG. 7.

FIG. 7 is a plan view of the first pixel PX1 illustrated in FIG. 3, and FIG. 8 is a cross-sectional view of the first pixel PX1 taken along line C-C' of FIG. 7.

Unlike the center pixel PX0 illustrated in FIGS. 4 to 6, the first pixel PX1 illustrated in FIGS. 7 and 8 may include a first pixel interior separation layer 181a formed in the substrate 110. Hereinafter, descriptions of FIGS. 7 and 8 focus on differences between the first pixel PX1 and the center pixel PX0 illustrated in FIGS. 4 to 6. Hereinafter, descriptions are given with reference to FIGS. 7 and 8.

As illustrated in FIG. 3, the first pixel PX1 is farther away from the central portion of the pixel array AR than the center pixel PX0. In other words, in a plan view, the first pixel PX1 may be farther away from the central portion of the first surface 111 of the substrate 110 than the center pixel PX0.

According to an example embodiment, the image sensor 10a may include a first device isolation layer DTI1 that separates the first pixel PX1 on the substrate 110 from other pixels (e.g., the center pixels PX0 and PX2) constituting the pixel array AR. In addition, the image sensor 10a may include a second device isolation layer DTI2 that separates the first area PX1a of the first pixel PX1 from the second area PX1b of the first pixel PX1.

The first pixel PX1 may include the first area PX1a and the second area PX1b arranged side-by-side in the second direction (X direction). One photodiode PD1 or PD2 may be formed in each of the first area PX1a of the first pixel PX1 and the second area PX1b of the first pixel PX1. The photodiodes PD1 or PD2 may be arranged in the form of a two-dimensional array in the second direction (X direction) and the third direction (Y direction) within the pixel array (see AR of FIG. 3) in a plan view. The first photodiode PD1 and the second photodiode PD2 may receive light of different wavelength bands and generate electric charges.

According to an example embodiment, the first pixel PX1 may include a first pixel interior separation layer 181a between the first photodiode PD1 in the first area PX1a and the second photodiode PD2 in the second area PX1b and extending in the first direction (Z direction). The first pixel interior separation layer 181a may extend from the first surface 111 of the substrate 110 toward the second surface 112 of the substrate 110. Therefore, unlike as illustrated in FIG. 8, according to the manufacturing process, the first pixel interior separation layer 181a may have a tapered shape in which the width thereof narrows from the first surface 111 of the substrate 110 to the second surface 112 of the substrate 110.

According to an example embodiment, a length L1 of the first device isolation layer DTI1 in the first direction (Z direction) may be equal or substantially equal to a length of the substrate 110 in the first direction (Z direction). That is, the length L1 of the first device isolation layer DTI1 in the first direction (Z direction) may be equal or substantially equal to the shortest distance between the first surface 111 and the second surface 112 of the substrate 110. However, according to the method of manufacturing the first device isolation layer DTI1, the length L1 of the first device isolation layer DTI1 in the first direction (Z direction) may be less than the length of the substrate 110 in the first direction (Z direction). The length of the first pixel interior separation layer 181a in the first direction (Z direction) may be less than the length of the first device isolation layer DTI1 in the first direction (Z direction).

The first pixel interior separation layer 181a may be between the first photodiode PD1 and the second photodiode PD2 in a plan view. The second device isolation layer DTI2 may be formed by penetrating between the first area PX1a and the second area PX1b of the first pixel PX1 by a certain width. In this case, a width w2 of the first pixel interior separation layer 181a in the second direction (X direction) may be less than a width w1 of the second device isolation layer DTI2 in the second direction (X direction).

According to an example embodiment, a second microlens 132 may be on the first surface 111 of the substrate 110. Referring to FIG. 3 together, microlenses may be respectively disposed to correspond to pixels constituting the pixel array AR. The second microlens 132 corresponding to the first pixel PX1 may be on the first surface 111 of the substrate 110. At this time, the upper surface of the second microlens 132 may have an upwardly convex shape. A highest point 132h of the upper surface of the second microlens 132 may be offset from the central portion of the first pixel PX1 by a first distance o1 in the first direction (Z direction). The first pixel PX1 may be farther away from the center of the pixel array AR than the center pixel PX0. Accordingly, light incident on the first pixel PX1 may have an incident angle that is greater than an incident angle of light incident on the center pixel PX0. In this case, incident light is biased toward one of the first photodiode PD1 and the second photodiode PD2. The first pixel PX1 may be shifted to the right from the center pixel PX0. Therefore, the second microlens 132 may be offset by the first distance o1 in the first direction (Z direction) so that light having a certain incident angle is equally incident on the first photodiode PD1 and the second photodiode PD2.

Light incident with the certain incident angle may pass through the second microlens 132 and the color filter 120 and then reach the first pixel interior separation layer 181a. In this case, light incident with the certain incident angle may be refracted or reflected by the first pixel interior separation layer 181a. Accordingly, light incident from the left side of the center of the first pixel PX1 may be refracted or reflected by the first pixel interior separation layer 181a and then incident on the first area PX1a, and light incident from the right side of the center of the first pixel PX1 may be refracted or reflected by the first pixel interior separation layer 181a and then incident on the second area PX1b.

According to an example embodiment, the first pixel interior separation layer 181a may include silicon oxide, silicon oxynitride, polycrystalline silicon doped with impurities, polycrystalline silicon undoped with impurities, amorphous silicon, and/or a metal material. The metal material may include, for example, tungsten, but example embodiments are not limited thereto.

Figure 9:
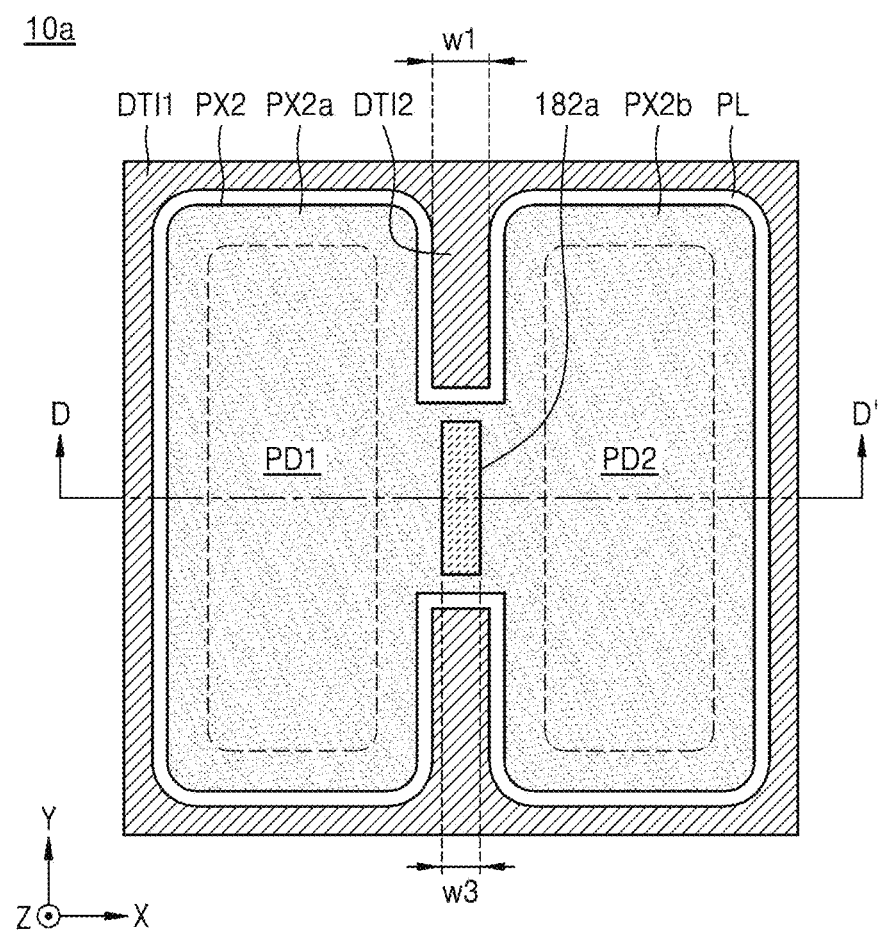
FIG. 9 is a plan view of a second pixel illustrated in FIG. 3.
Figure 10:
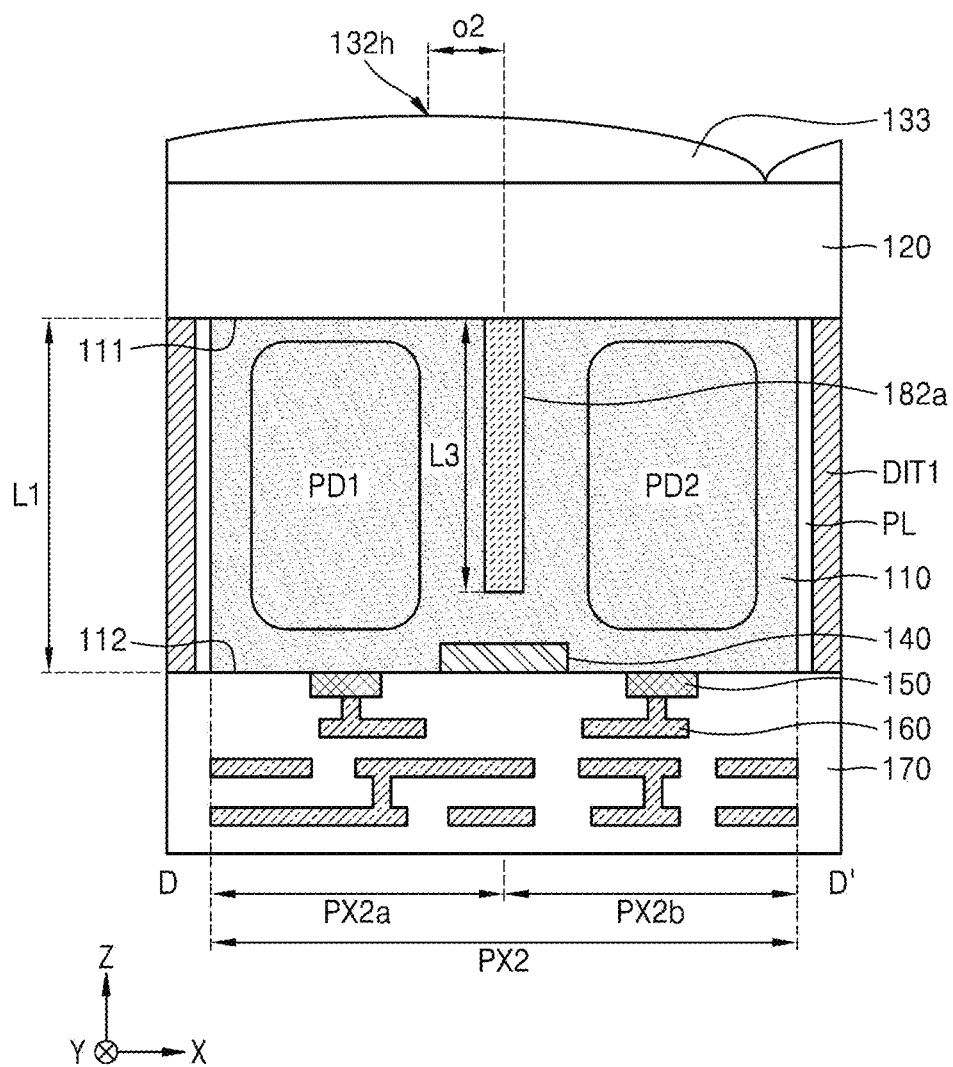
FIG. 10 is a cross-sectional view of the second pixel taken along line D-D' of FIG. 9.

FIG. 9 is a plan view of the second pixel PX2 illustrated in FIG. 3, and FIG. 10 is a cross-sectional view of the second pixel PX2 taken along line D-D' of FIG. 9.

The second pixel PX2 illustrated in FIGS. 9 and 10 may include a second pixel interior separation layer 182a that is longer in the first direction (Z direction) than the first pixel interior separation layer 181a of the first pixel PX1 illustrated in FIGS. 7 and 8. Hereinafter, descriptions of FIGS. 9 and 10 focus on differences from FIGS. 7 and 8. Hereinafter, descriptions are given with reference to FIGS. 9 and 10.

As illustrated in FIG. 3, the second pixel PX2 is farther away from the central portion of the pixel array AR than the first pixel PX1. In other words, in a plan view, the second pixel PX2 may be farther away from the central portion of the first surface 111 of the substrate 110 than the first pixel PX1.

The second pixel PX2 may include a first area PX2a and a second area PX2b arranged side-by-side in the second direction (X direction). One photodiode PD1 or PD2 may be formed in each of the first area PX2a of the second pixel PX2 and the second area PX2b of the second pixel PX2. The photodiodes PD1 or PD2 may be arranged in the form of a two-dimensional array in the second direction (X direction) and the third direction (Y direction) within the pixel array (e.g., AR of FIG. 1) in a plan view. The first photodiode PD1 and the second photodiode PD2 may receive light of different wavelength bands and generate electric charges.

According to an example embodiment, the second pixel PX2 may include a second pixel interior separation layer 182a between the first photodiode PD1 in the first area PX2a and the second photodiode PD2 in the second area PX2b and extending in the first direction (Z direction). The second pixel interior separation layer 182a may extend from the first surface 111 of the substrate 110 toward the second surface 112 of the substrate 110. Therefore, unlike as illustrated in FIG. 8, according to the manufacturing process, the second pixel interior separation layer 182a may have a tapered shape in which the width thereof narrows from the first surface 111 of the substrate 110 to the second surface 112 of the substrate 110.

The length of the second pixel interior separation layer 182a in the first direction (Z direction) may be less than the length of the first device isolation layer DTI1 in the first direction (Z direction).

The second pixel interior separation layer 182a may be between the first photodiode PD1 and the second photodiode PD2 in a plan view. The second device isolation layer DTI2 may be formed by penetrating between the first area PX2a and the second area PX2b of the second pixel PX2 by a certain width. In this case, a width w3 of the second pixel interior separation layer 182a in the second direction (X direction) may be less than a width w1 of the second device isolation layer DTI2 in the second direction (X direction).

According to an example embodiment, a third microlens 133 may be on the first surface 111 of the substrate 110. Referring to FIG. 3 together, microlenses may be respectively disposed to correspond to pixels constituting the pixel array AR. The third microlens 133 corresponding to the second pixel PX2 may be on the first surface 111 of the substrate 110. At this time, the upper surface of the third microlens 133 may have an upwardly convex shape. A highest point 133h of the upper surface of the third microlens 133 may be offset from the central portion of the first pixel PX1 by a second distance o2 in the first direction (Z direction). The second pixel PX2 may be farther away from the center of the pixel array AR than the center pixel PX0. Accordingly, light incident on the second pixel PX2 may have an incident angle that is greater than an incident angle of light incident on the center pixel PX0. In this case, incident light is biased toward one of the first photodiode PD1 and the second photodiode PD2. The second pixel PX2 may be shifted to the right from the center pixel PX0. Therefore, the third microlens 133 may be offset by the second distance o2 in the second direction (X direction) so that light having a certain incident angle is equally incident on the first photodiode PD1 and the second photodiode PD2.

Light incident with the certain incident angle may pass through the third microlens 133 and the color filter 120 and then reach the second pixel interior separation layer 182a. In this case, light incident with the certain incident angle may be refracted or reflected by the second pixel interior separation layer 182a. Accordingly, light incident from the left side of the center of the second pixel PX2 may be refracted or reflected by the second pixel interior separation layer 182a and then incident on the first area PX2a, and light incident from the right side of the center of the second pixel PX2 may be refracted or reflected by the second pixel interior separation layer 182a and then incident on the second area PX2b.

A length L3 of the second pixel interior separation layer 182a in the first direction (Z direction) and the width w3 of the second pixel interior separation layer 182a in the second direction (X direction) may be greater than a length L2 of the first pixel interior separation layer 181a illustrated in FIGS. 7 and 8 in the first direction (Z direction) and the width w1 of the first pixel interior separation layer 181a illustrated in FIGS. 7 and 8 in the second direction (X direction). Because the second pixel PX2 is farther away from the center of the pixel array AR than the first pixel PX1, an incident angle of light incident on the second pixel PX2 may be greater than an incident angle of light incident on the first pixel PX1. At this time, because the length of the second pixel interior separation layer 182a in the first direction (Z direction) and the width of the second pixel interior separation layer 182a in the second direction (X direction) are greater than those of the first pixel interior separation layer 181a, the amount of light refracted and reflected by the second pixel interior separation layer 182a may be greater than the amount of light refracted and reflected by the first pixel interior separation layer 181a. Therefore, even though the incident angle of light incident on the second pixel PX2 is greater than the incident angle of light incident on the first pixel PX1, a phenomenon in which incident light is biased toward one of the first photodiode PD1 and the second photodiode PD2 in the second pixel PX2 may be limited and/or prevented. In other words, similarly to the case where light is uniformly incident on the first area PX1a and the second area PX1b of the first pixel PX1 by the first pixel interior separation layer 181a, light may be uniformly incident on the first area PX2a and the second area PX2b of the second pixel PX2 by the second pixel interior separation layer 182a.

According to an example embodiment, the second pixel interior separation layer 182a may include silicon oxide, silicon oxynitride, polycrystalline silicon doped with impurities, polycrystalline silicon undoped with impurities, amorphous silicon, and/or a metal material. The metal material may include, for example, tungsten, but example embodiments are not limited thereto.

Figure 11:
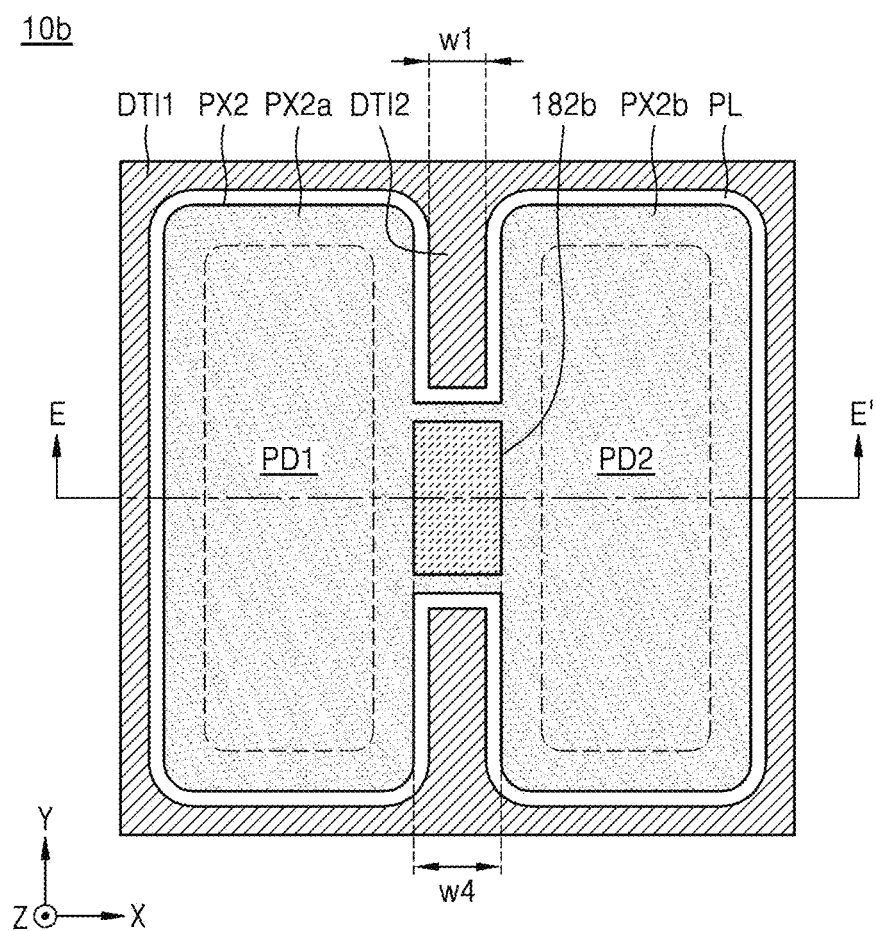
FIG. 11 is a plan view of a second pixel of an image sensor according to an example embodiment, which corresponds to the second pixel illustrated in FIG. 3.
Figure 12:
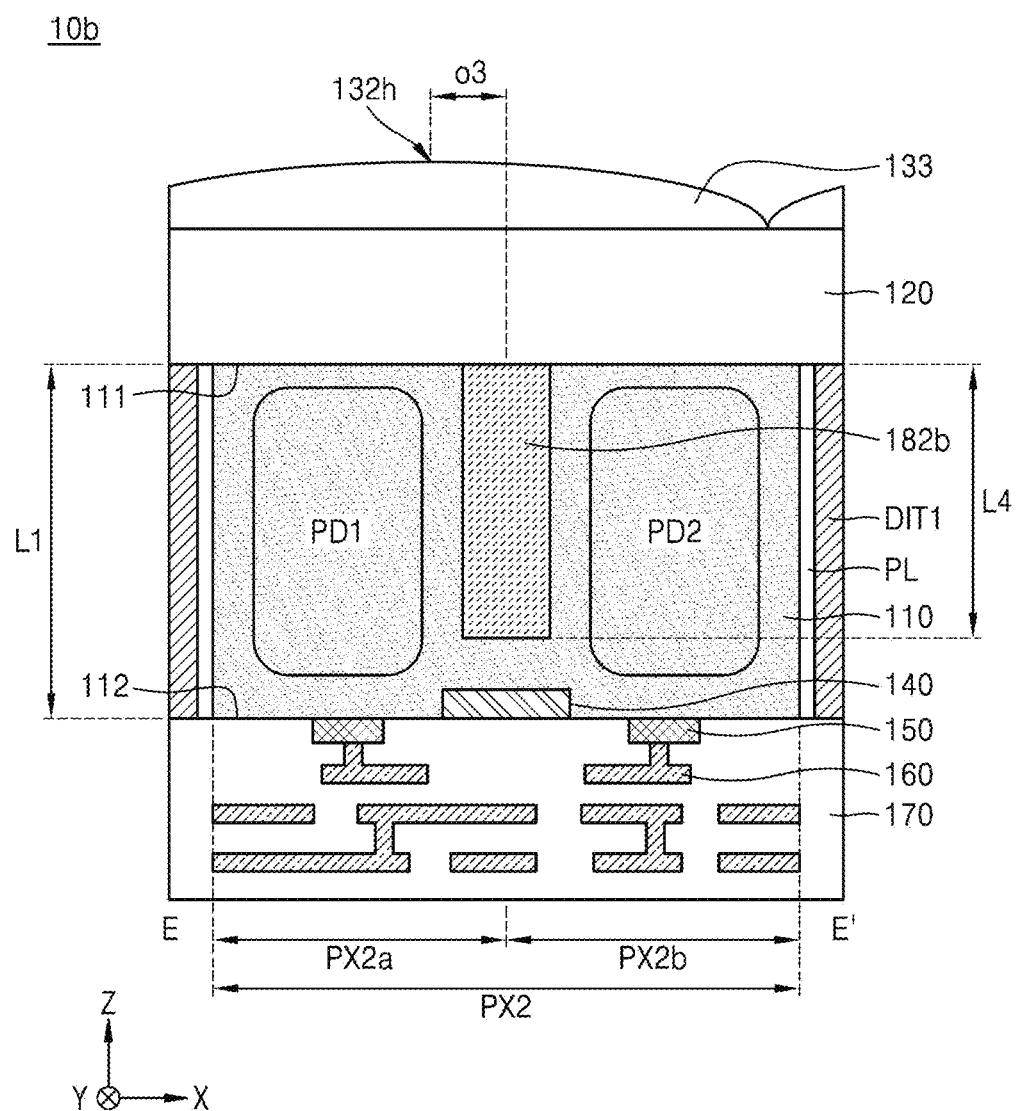
FIG. 12 is a cross-sectional view of the second pixel taken along line E-E' of FIG. 11.

FIG. 11 is a plan view of a second pixel PX2 of an image sensor 10b according to another example embodiment, which corresponds to the second pixel PX2 illustrated in FIG. 3, and FIG. 12 is a cross-sectional view of the second pixel PX2 taken along line E-E' of FIG. 11.

The image sensor 10b illustrated in FIGS. 11 and 12 may include a second pixel interior separation layer 182b that is wider in the second direction (X direction) than the second pixel interior separation layer 182a of the image sensor 10a illustrated in FIGS. 9 and 10. Hereinafter, descriptions of FIGS. 11 and 12 focus on the differences from FIGS. 9 and 10. Hereinafter, descriptions are given with reference to FIGS. 11 and 12.

The image sensor 10b according to an example embodiment may include a second pixel PX2 farther away from the center of a pixel array AR than a first pixel PX1. The second pixel PX2 may include a first area PX2a and a second area PX2b arranged side-by-side in the second direction (X direction). One photodiode PD1 or PD2 may be formed in each of the first area PX2a of the second pixel PX2 and the second area PX2b of the second pixel PX2.

According to an example embodiment, the second pixel PX2 may include a second pixel interior separation layer 182b between a first photodiode PD1 in the first area PX2a and a second photodiode PD2 in the second area PX2b and extending in the first direction (Z direction). Unlike the second pixel interior separation layer 182a illustrated in FIGS. 9 and 10, the width w4 of the second pixel interior separation layer 182b illustrated in FIGS. 11 and 12 in the second direction (X direction) may be greater than the width w1 of the second device isolation layer DTI2 in the second direction (X direction).

The second pixel interior separation layer 182b may be formed to extend from a first surface 111 of a substrate 110 toward a second surface 112 of the substrate 110. At this time, a length L1 of the first device isolation layer DTI1 in the first direction (Z direction) may be equal or substantially equal to the shortest length between the first surface 111 and the second surface 112 of the substrate 110. The length of the second pixel interior separation layer 182b in the first direction (Z direction) may be less than the length of the first device isolation layer DTI1. However, according to the manufacturing process, the length of the second pixel interior separation layer 182b in the first direction (Z direction) may be equal or substantially equal to the length of the first device isolation layer DTI1. In other words, a length L4 of the second pixel interior separation layer 182a in the first direction (Z direction) may be equal or substantially equal to the shortest length between the first surface 111 and the second surface 112 of the substrate 110.

Figure 13:
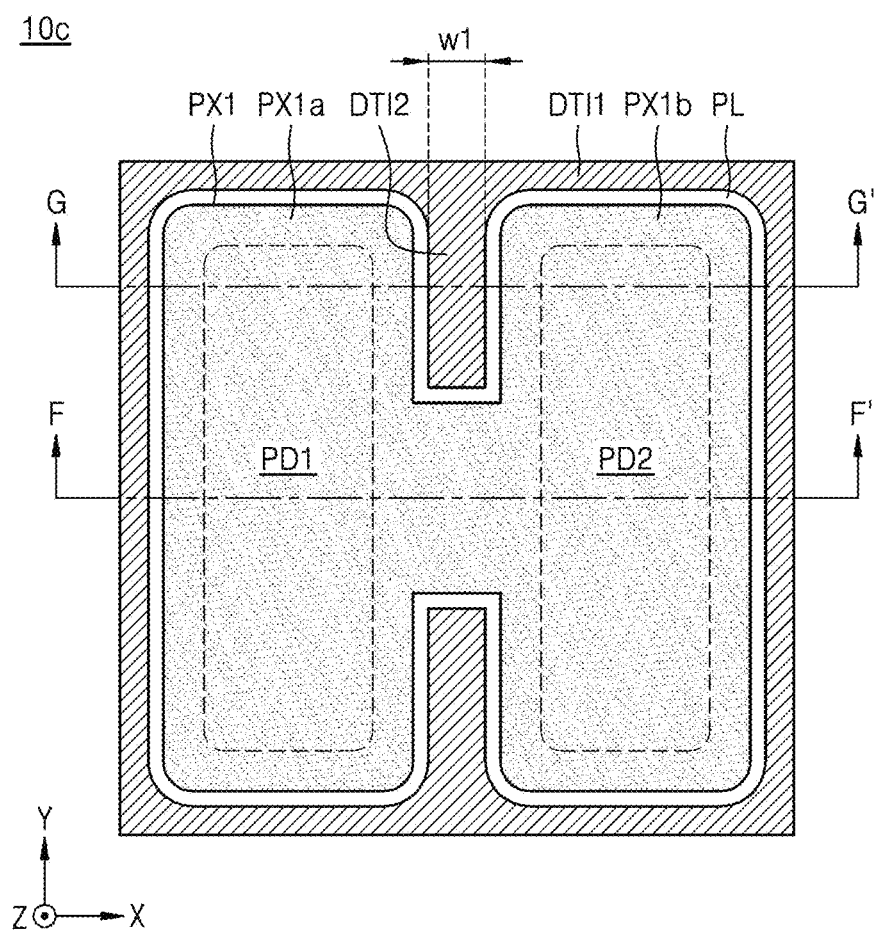
FIG. 13 is a plan view of a center pixel of an image sensor according to an example embodiment, which corresponds to the center pixel illustrated in FIG. 3.
Figure 14:
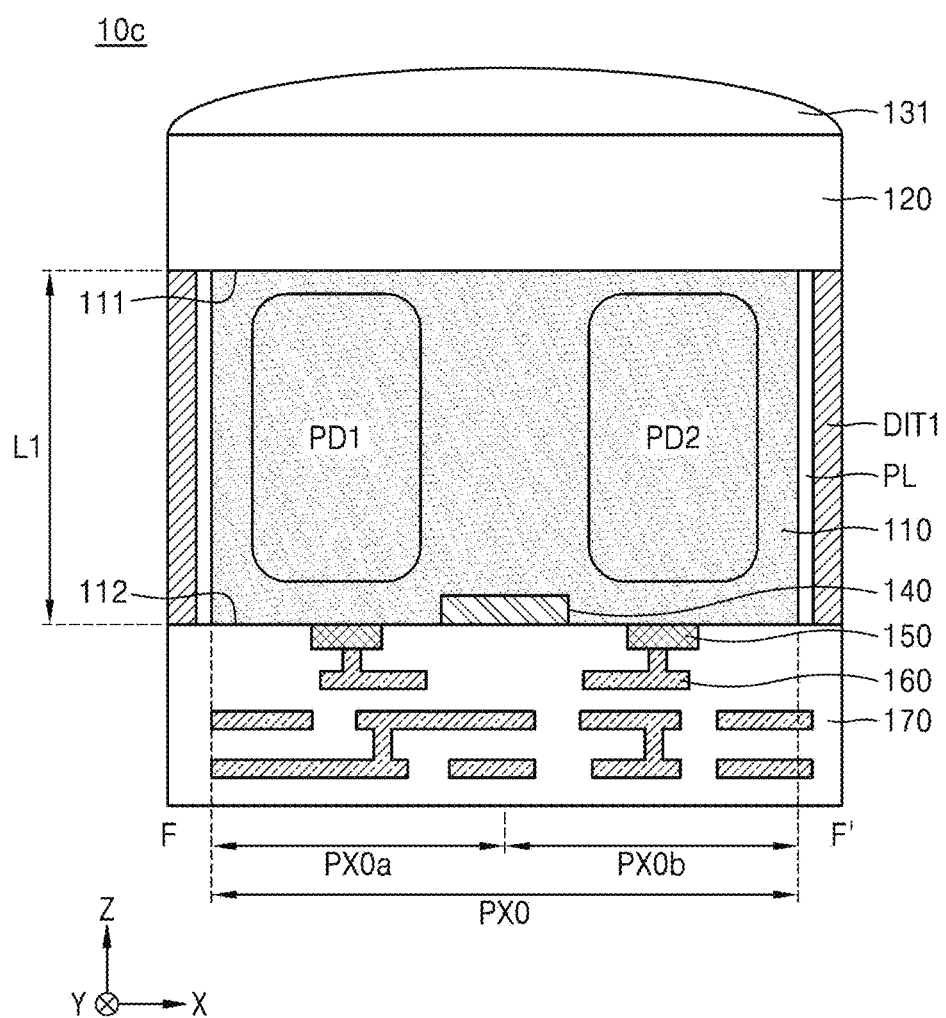
FIG. 14 is a cross-sectional view of the center pixel taken along line F-F' of FIG. 13.
Figure 15:
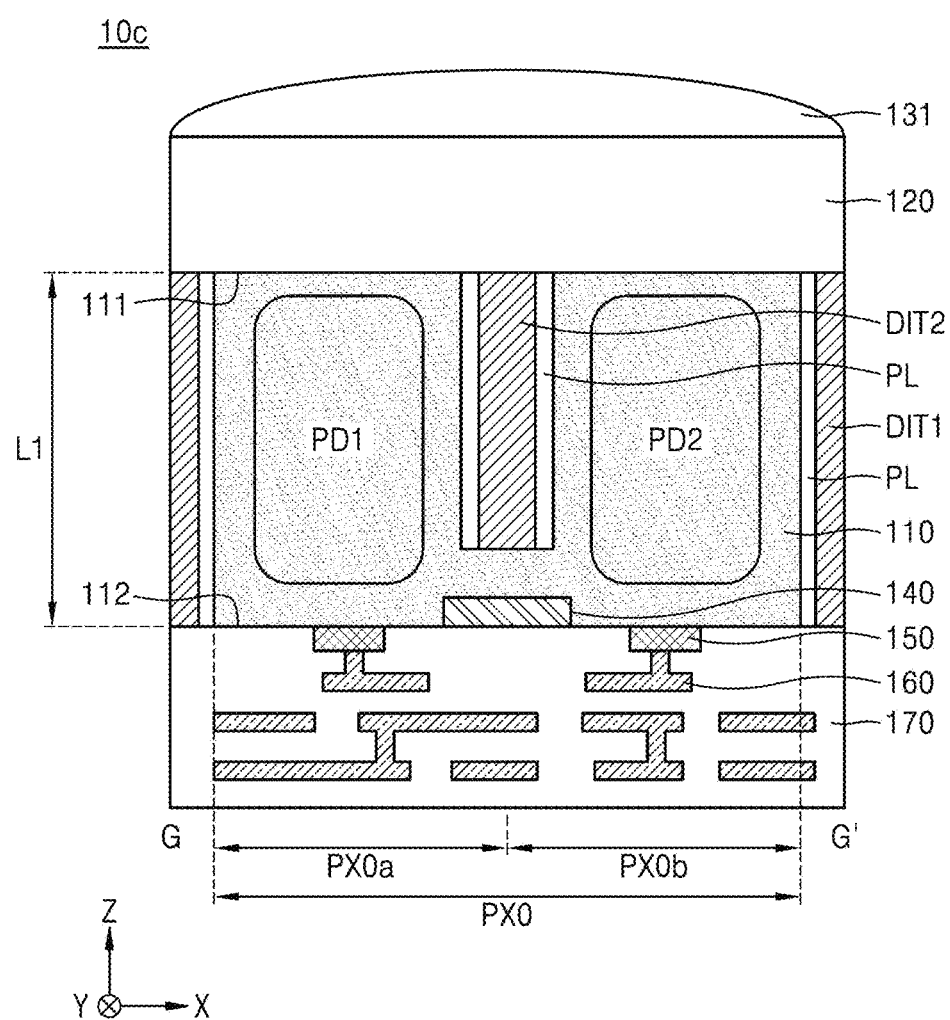
FIG. 15 is a cross-sectional view of the center pixel taken along line G-G' of FIG. 14.

FIG. 13 is a plan view of a center pixel PX0 of an image sensor 10c according to another example embodiment, which corresponds to the center pixel PX0 illustrated in FIG. 3, FIG. 14 is a cross-sectional view of the center pixel PX0 taken along line F-F' of FIG. 13, and FIG. 15 is a cross-sectional view of the center pixel PX0 taken along line G-G' of FIG. 14. Because the structure and characteristics of the center pixel PX0 of the image sensor 10c illustrated in FIGS. 13 to 15 are the same or substantially the same as the structure and characteristics of the center pixel PX0 of the image sensor 10a illustrated in FIGS. 4 to 6, a detailed description thereof is omitted.

Figure 16:
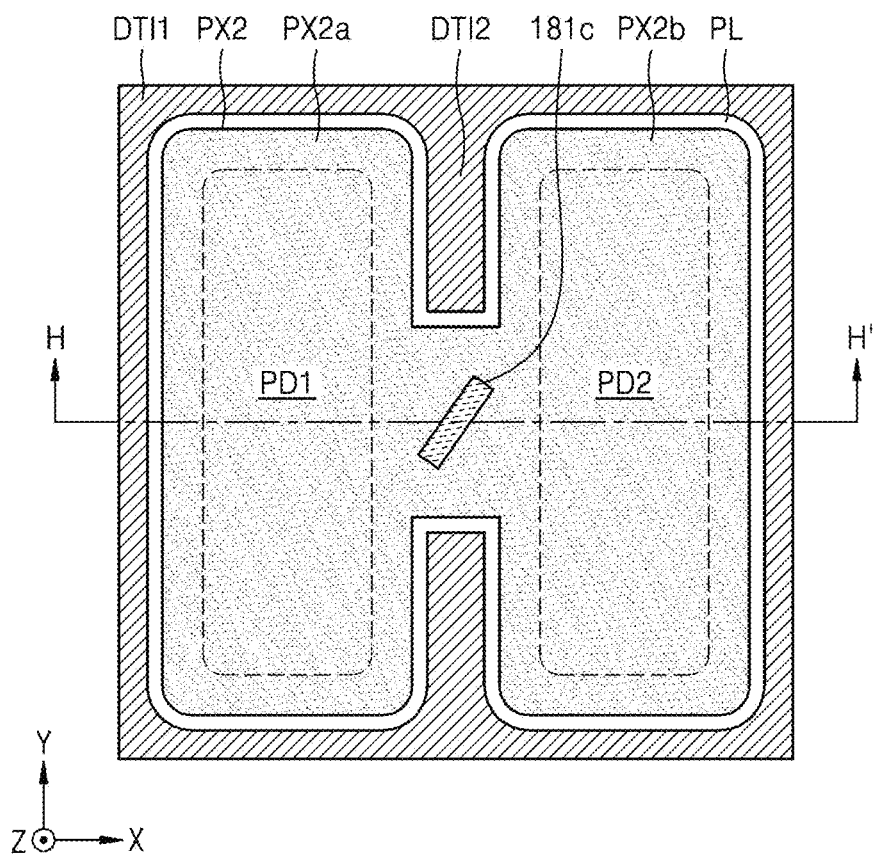
FIG. 16 is a plan view of a first pixel of an image sensor according to an example embodiment, which corresponds to the first pixel illustrated in FIG. 3.
Figure 17:
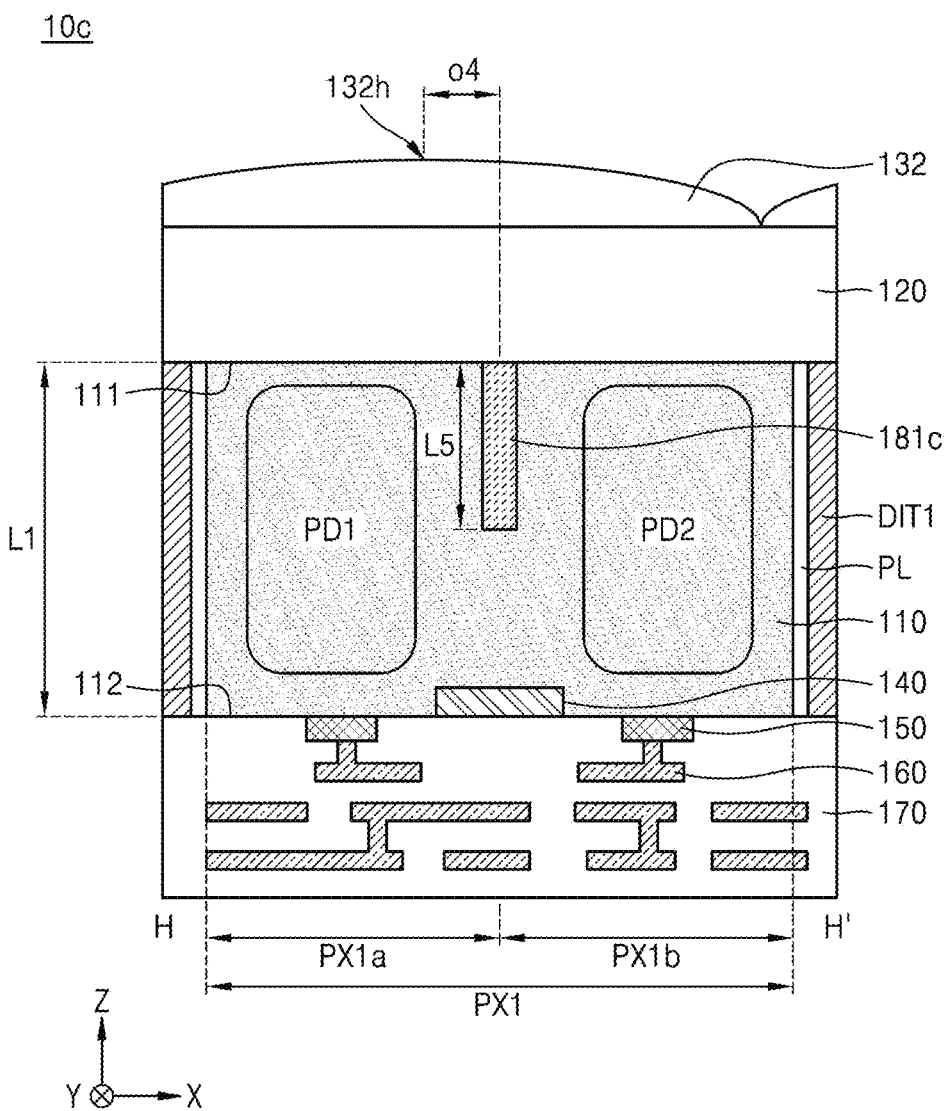
FIG. 17 is a cross-sectional view of the first pixel taken along line H-H' of FIG. 16.

FIG. 16 is a plan view of a first pixel PX1 of an image sensor 10c according to another example embodiment, which corresponds to the first pixel PX1 illustrated in FIG. 3, and FIG. 17 is a cross-sectional view of the first pixel PX1 taken along line H-H' of FIG. 16. Hereinafter, descriptions of FIGS. 16 and 17 focus on the differences from FIGS. 7 and 8. Hereinafter, descriptions are given with reference to FIGS. 16 and 17.

Unlike the first pixel interior separation layer 181a illustrated in FIGS. 7 and 8, a first pixel interior separation layer 181c of the first pixel PX1 illustrated in FIGS. 16 and 17 may extend in a direction crossing the second direction (X direction) and the third direction (Y direction) perpendicular to the second direction (X direction). In other words, the first pixel interior separation layer 181c may extend in a direction oblique to the second direction (X direction). Because the first pixel interior separation layer 181c extends in a direction oblique to the second direction (X direction), which is a direction in which the pair of photodiodes PD1 and PD2 is arranged side-by-side, light incident through the second microlens 132 may be split into the first photodiode PD1 and the second photodiode PD2. That is, because light incident through the second microlens 132 is split into the first photodiode PD1 and the second photodiode PD2, the problem of auto focusing performance in a horizontal pattern direction may be solved while maintaining auto focusing performance in a vertical pattern direction.

The first pixel interior separation layer 181c may be formed to extend from a first surface 111 of a substrate 110 toward a second surface 112 of the substrate 110. At this time, a length L1 of the first device isolation layer DTI1 in the first direction (Z direction) may be equal or substantially equal to the shortest length between the first surface 111 and the second surface 112 of the substrate 110. A length L5 of the first pixel interior separation layer 181c in the first direction (Z direction) may be less than the length L1 of the first device isolation layer DTI1 in the first direction (Z direction). However, depending on the manufacturing process, the length L5 of the first pixel interior separation layer 181c in the first direction (Z direction) may be equal or substantially equal to the length L1 of the first device isolation layer DTI1 in the first direction (Z direction). In other words, the length L5 of the first pixel interior separation layer 181c in the first direction (Z direction) may be equal or substantially equal to the shortest length between the first surface 111 and the second surface 112 of the substrate 110.

According to an example embodiment, the second microlens 132 may be on the first surface 111 of the substrate 110. The upper surface of the second microlens 132 may have an upwardly convex shape. A highest point 132h of the upper surface of the second microlens 132 may be offset from the central portion of the first pixel PX1 by a fourth distance o4 in the second direction (X direction). Because the second microlens 132 of the image sensor 10c illustrated in FIGS. 16 and 17 is offset in the second direction (X direction), the possible effect is the same or substantially the same as the offset effect of the second microlens 132 described with reference to FIGS. 7 and 8.

Figure 18:
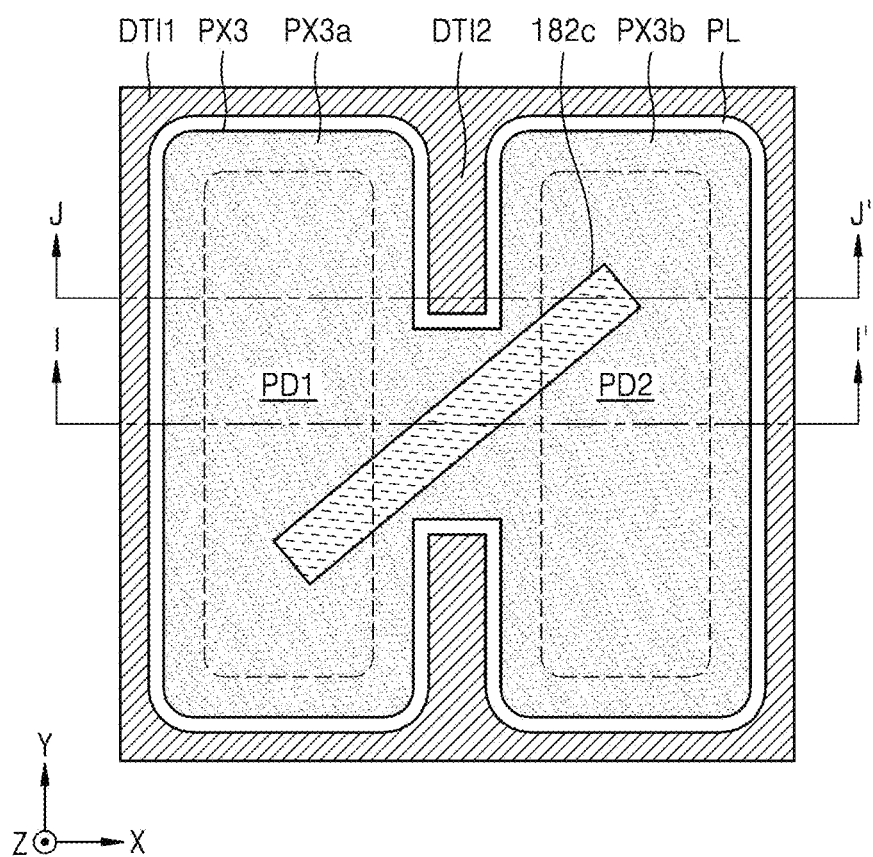
FIG. 18 is a plan view of a second pixel of an image sensor according to an example embodiment, which corresponds to the second pixel illustrated in FIG. 3.
Figure 19:
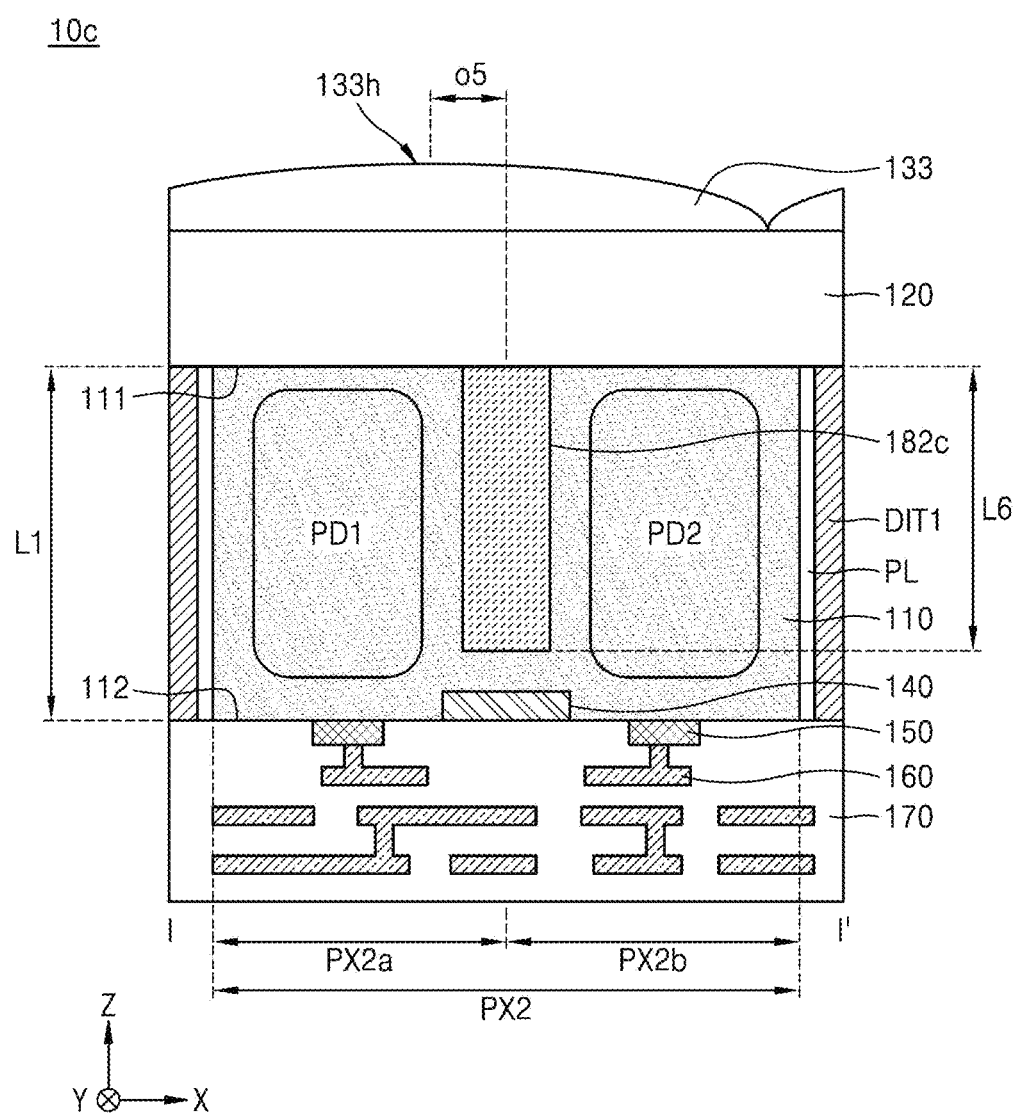
FIG. 19 is a cross-sectional view of the second pixel taken along line I-I' of FIG. 18.
Figure 20:
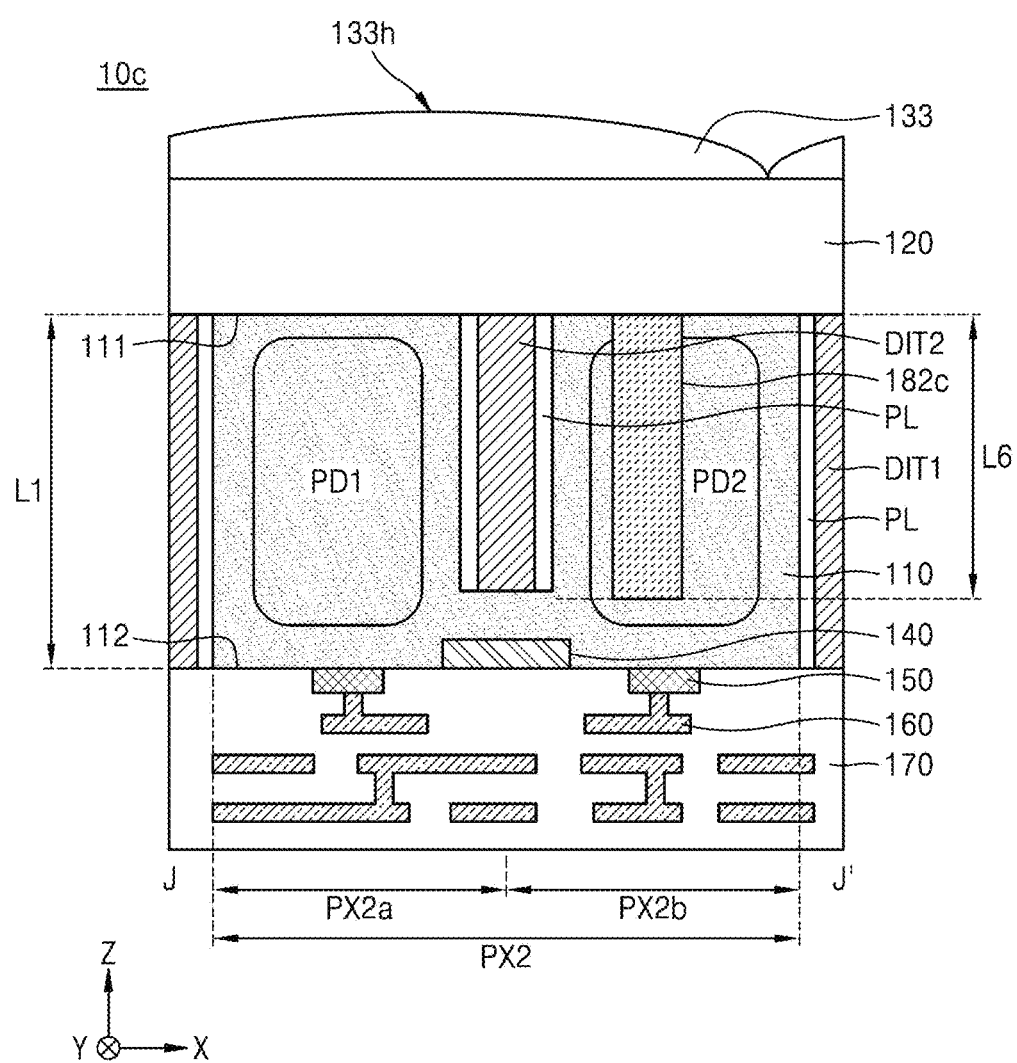
FIG. 20 is a cross-sectional view of the second pixel taken along line J-J' of FIG. 18.

FIG. 18 is a plan view of a second pixel PX2 of an image sensor 10c according to another example embodiment, which corresponds to the second pixel PX2 illustrated in FIG. 3, FIG. 19 is a cross-sectional view of the second pixel PX2 taken along line I-I' of FIG. 18, and FIG. 20 is a cross-sectional view of the second pixel PX2 taken along line J-J' of FIG. 18. Hereinafter, descriptions of FIGS. 18 to 20 focus on the differences from FIGS. 16 and 17. Hereinafter, descriptions are given with reference to FIGS. 18 to 20.

A length L6 of a second pixel interior separation layer 182c illustrated in FIGS. 18 to 20 in the first direction (Z direction) may be greater than the length L5 of the first pixel interior separation layer 181c illustrated in FIGS. 16 and 17 in the first direction (Z direction). In addition, the second pixel interior separation layer 182c may extend in a direction oblique to the second direction (X direction) and the third direction (Y direction). The diagonally extended length of the second pixel interior separation layer 182c may be greater than the diagonally extended length of the first pixel interior separation layer 181c illustrated in FIGS. 16 and 17. Therefore, as illustrated in FIG. 20, the second pixel interior separation layer 182c may overlap a portion of at least one of a first photodiode PD1 and a second photodiode PD2 in the first direction (Z direction).

A width of the second pixel interior separation layer 182c in the diagonal direction may be greater than a width of the first pixel interior separation layer 181c illustrated in FIGS. 16 and 17 in the diagonal direction. Because a second pixel PX2 is farther away from the center of a pixel array AR than a first pixel PX1, an incident angle of light incident on the second pixel PX2 may be greater than an incident angle of light incident on the first pixel PX1. At this time, because the length of the second pixel interior separation layer 182c in the first direction (Z direction) and the width of the second pixel interior separation layer 182c in the diagonal direction are greater than those of the first pixel interior separation layer 181c, the amount of light refracted and reflected by the second pixel interior separation layer 182a may be greater than the amount of light refracted and reflected by the first pixel interior separation layer 181c. Therefore, even though the incident angle of light incident on the second pixel PX2 is greater than the incident angle of light incident on the first pixel PX1, a phenomenon in which incident light is biased toward one of the first photodiode PD1 and the second photodiode PD2 in the second pixel PX2 may be limited and/or prevented. In other words, similarly to the case where light is uniformly incident on the first area PX1a and the second area PX1b of the first pixel PX1 by the first pixel interior separation layer 181c, light may be uniformly incident on the first area PX2a and the second area PX2b of the second pixel PX2 by the second pixel interior separation layer 182c. Even though an offset distance o5 of a third microlens 133 corresponding to the second pixel PX2 is equal or substantially equal to the offset distance o4 of the second microlens 132 corresponding to the first pixel PX1, the amount of light incident on the first area PX2a of the second pixel PX2 may be equal to the amount of light incident on the second area PX2b of the second pixel PX2.

Figure 21:
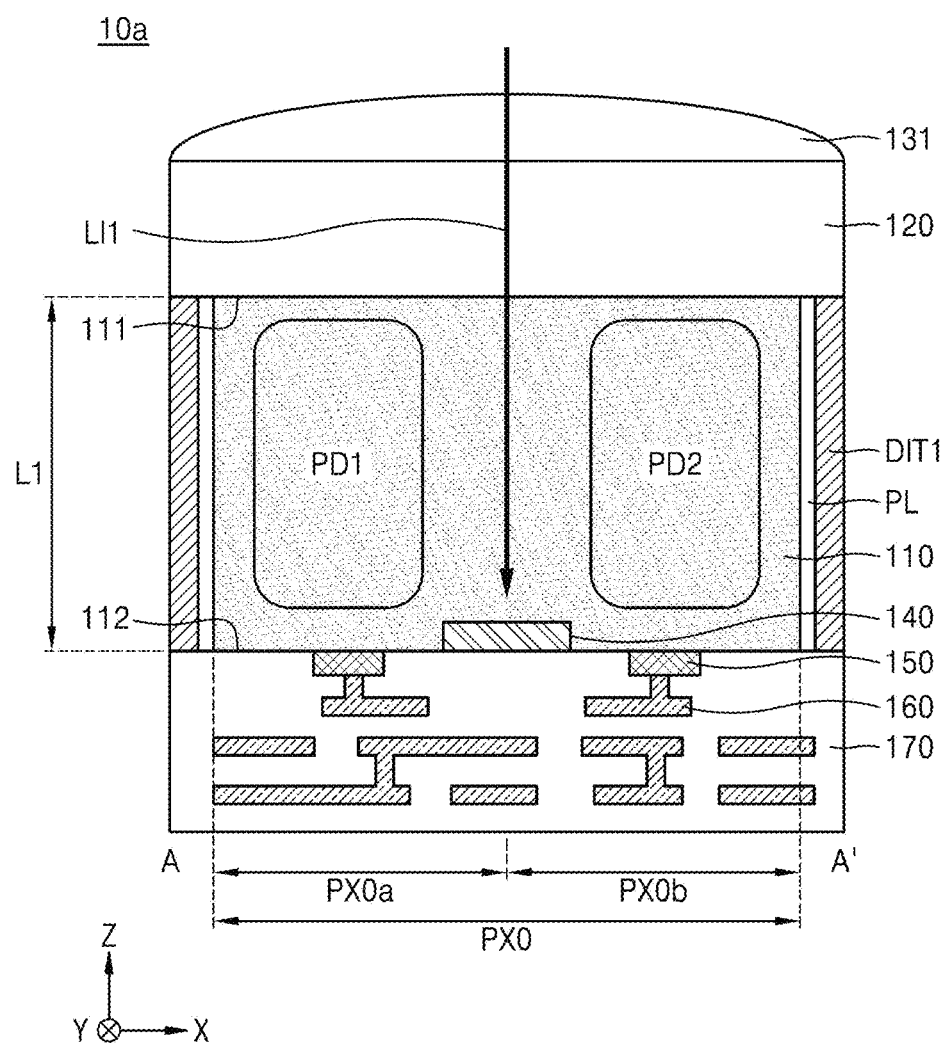
FIGS. 21 to 23 are cross-sectional views for describing some effects of the inventive concepts.
Figure 22:
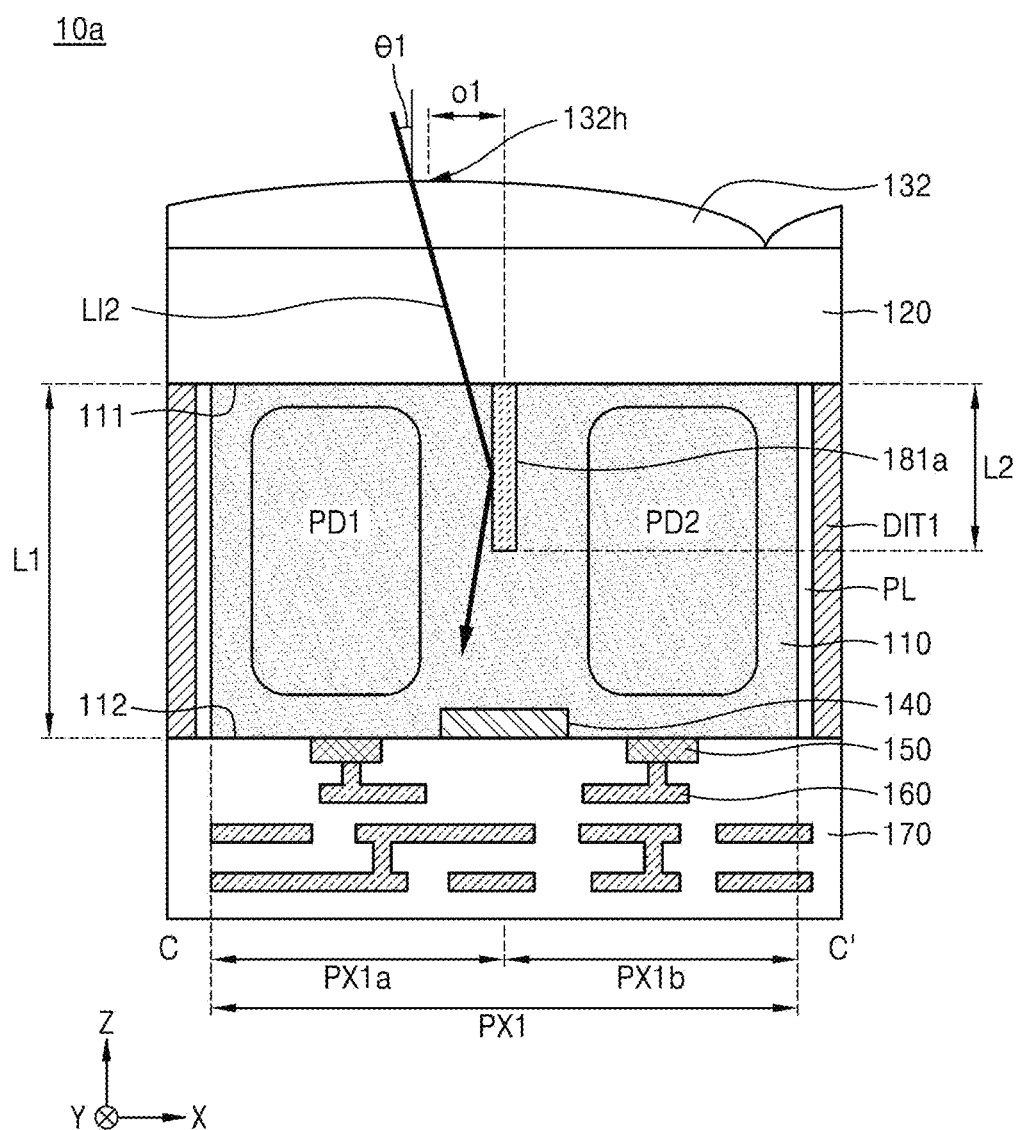
Figure 23:
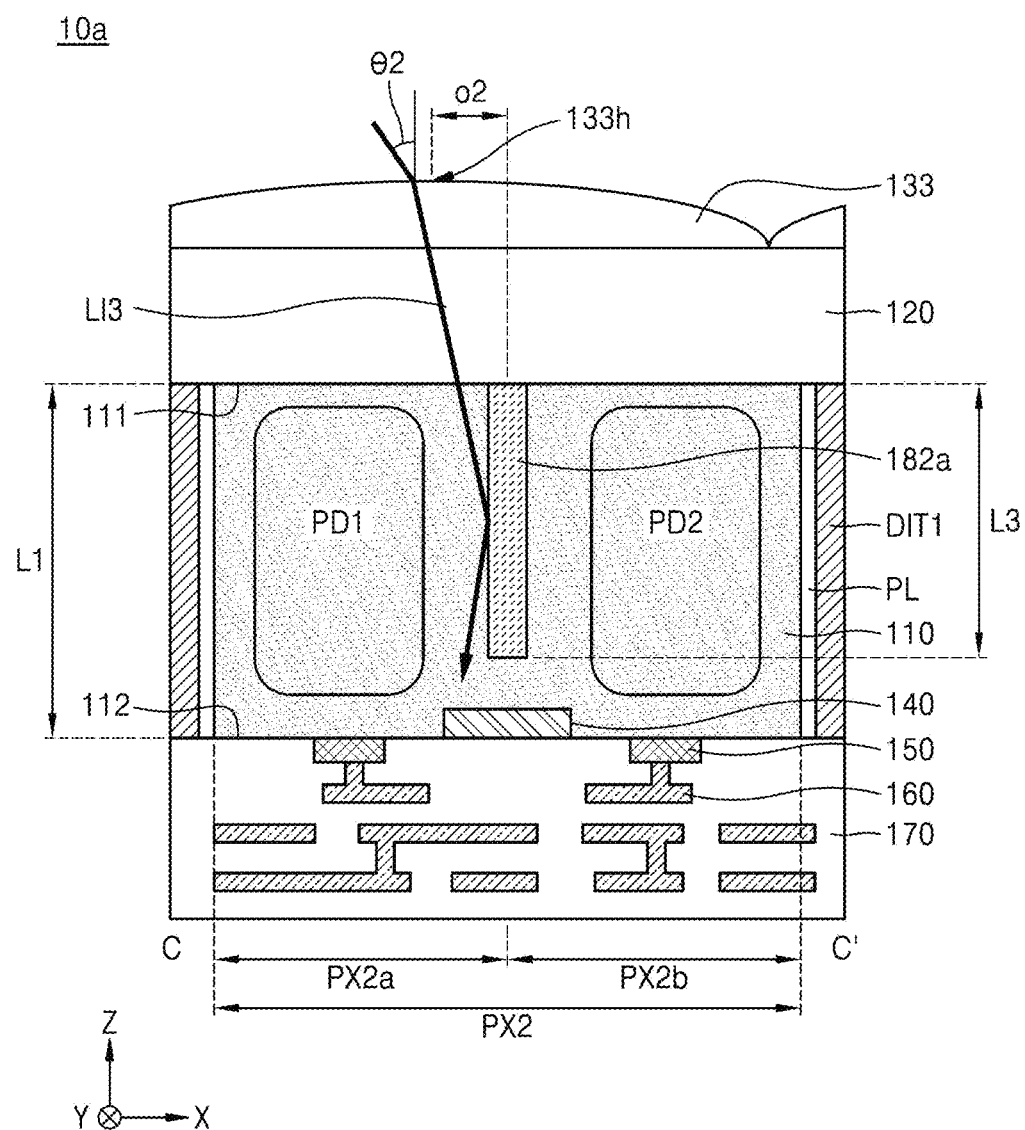

FIGS. 21 to 23 are cross-sectional views for describing some effects of the inventive concepts; Specifically, FIG. 21 is a cross-sectional view illustrating a process in which light is incident on the center pixel PX0 of FIG. 3, FIG. 22 is a cross-sectional view illustrating a process in which light is incident on the first pixel PX1 of FIG. 3, and FIG. 23 is a cross-sectional view illustrating a process in which light is incident on the second pixel PX2 of FIG. 3.

Referring to FIG. 21, as illustrated in FIG. 3, the center pixel PX0 is a pixel arranged adjacent to the central portion of the pixel array AR. In other words, the center pixel PX0 is a pixel arranged adjacent to the central portion of the first surface 111 of the substrate 110 in a plan view. The first microlens 131 corresponding to the center pixel PX0 may be disposed on the first surface 111 of the substrate 110. At this time, the highest point of the upwardly convex upper surface of the first microlens 131 may be aligned with the central portion of the center pixel PX0 in the first direction (Z direction).

As illustrated in FIG. 21, first light LI1 may be incident toward the first microlens 131 of the center pixel PX0. At this time, the incident angle of the first light LI1 may converge to 0 degrees. Accordingly, the first light LI1 may pass through the first microlens 131 and the color filter 120, without being substantially refracted, and then reach the substrate 110.

Referring to FIG. 22, as illustrated in FIG. 3, the first pixel PX1 is farther away from the central portion of the pixel array AR than the center pixel PX0. In other words, in a plan view, the first pixel PX1 may be farther away from the central portion of the first surface 111 of the substrate 110 than the center pixel PX0.

The second microlens 132 corresponding to the first pixel PX1 may be on the first surface 111 of the substrate 110. At this time, the highest point 132h of the upwardly convex upper surface of the second microlens 132 may be offset from the central portion of the first pixel PX1 by the first distance o1 in the first direction (Z direction). Second light LI2 incident toward the second microlens 132 of the first pixel PX1 may have a first incident angle θ1 that is greater than an incident angle of the first light LI1 incident on the center pixel PX0 illustrated in FIG. 21. The second light LI2 transmitted through the second microlens 132 and the color filter 120 may reach the first pixel interior separation layer 181a between the first photodiode PD1 and the second photodiode PD2. The second light LI2 incident toward the second area PX1b of the first pixel PX1 may be reflected from the first pixel interior separation layer 181a and then directed to the first area PX1a of the first pixel PX1. Therefore, the second light LI2 having the first incident angle θ1 is not biased to the second photodiode PD2 but may be equally incident on the first photodiode PD1 and the second photodiode PD2.

Although pixels are illustrated on the right side of the center of the pixel array AR, the same applies to pixels arranged on the left side of the center of the pixel array AR. In the case of pixels arranged on the left side of the center of the pixel array AR, the second light LI2 having the first incident angle θ1 is not biased to the first photodiode PD1 but may be equally incident on the first photodiode PD1 and the second photodiode PD2.

Referring to FIG. 23, as illustrated in FIG. 3, the second pixel PX2 is farther away from the central portion of the pixel array AR than the first pixel PX1. In other words, in a plan view, the second pixel PX2 may be farther away from the central portion of the first surface 111 of the substrate 110 than the first pixel PX1.

The third microlens 133 corresponding to the second pixel PX2 may be on the first surface 111 of the substrate 110. At this time, the highest point 133h of the upwardly convex upper surface of the third microlens 133 may be offset from the central portion of the second pixel PX2 by the second distance o2 in the first direction (Z direction). Third light LI3 incident toward the third microlens 133 of the second pixel PX2 may have a second incident angle θ2 that is greater than an incident angle of the second light LI2 incident on the first pixel PX1 illustrated in FIG. 22. The third light LI3 transmitted through the third microlens 133 and the color filter 120 may reach the second pixel interior separation layer 182a between the first photodiode PD1 and the second photodiode PD2. The third light LI3 incident toward the second area PX2b of the second pixel PX2 may be reflected from the second pixel interior separation layer 182a and then directed to the first area PX2a of the second pixel PX2. Therefore, the third light LI3 having the second incident angle θ2 is not biased to the second photodiode PD2 but may be equally incident on the first photodiode PD1 and the second photodiode PD2.

Because the third light LI3 incident on the second pixel PX2 has an incident angle that is greater than an incident angle of the second light LI2 incident on the first pixel PX1, the probability of being biased to the second photodiode PD2 in the second pixel PX2 is high, compared with the first pixel PX1. However, because the length L3 of the second pixel interior separation layer 182a in the first direction (Z direction) is greater than the length L2 of the first pixel interior separation layer 181a in the first direction (Z direction), the amount of light reflected by the second pixel interior separation layer 182a may be greater than the amount of light reflected by the first pixel interior separation layer 181a. Therefore, even in the case of the second pixel PX2, light may be equally incident on the pair of photodiodes PD1 and PD2.

Figure 24:
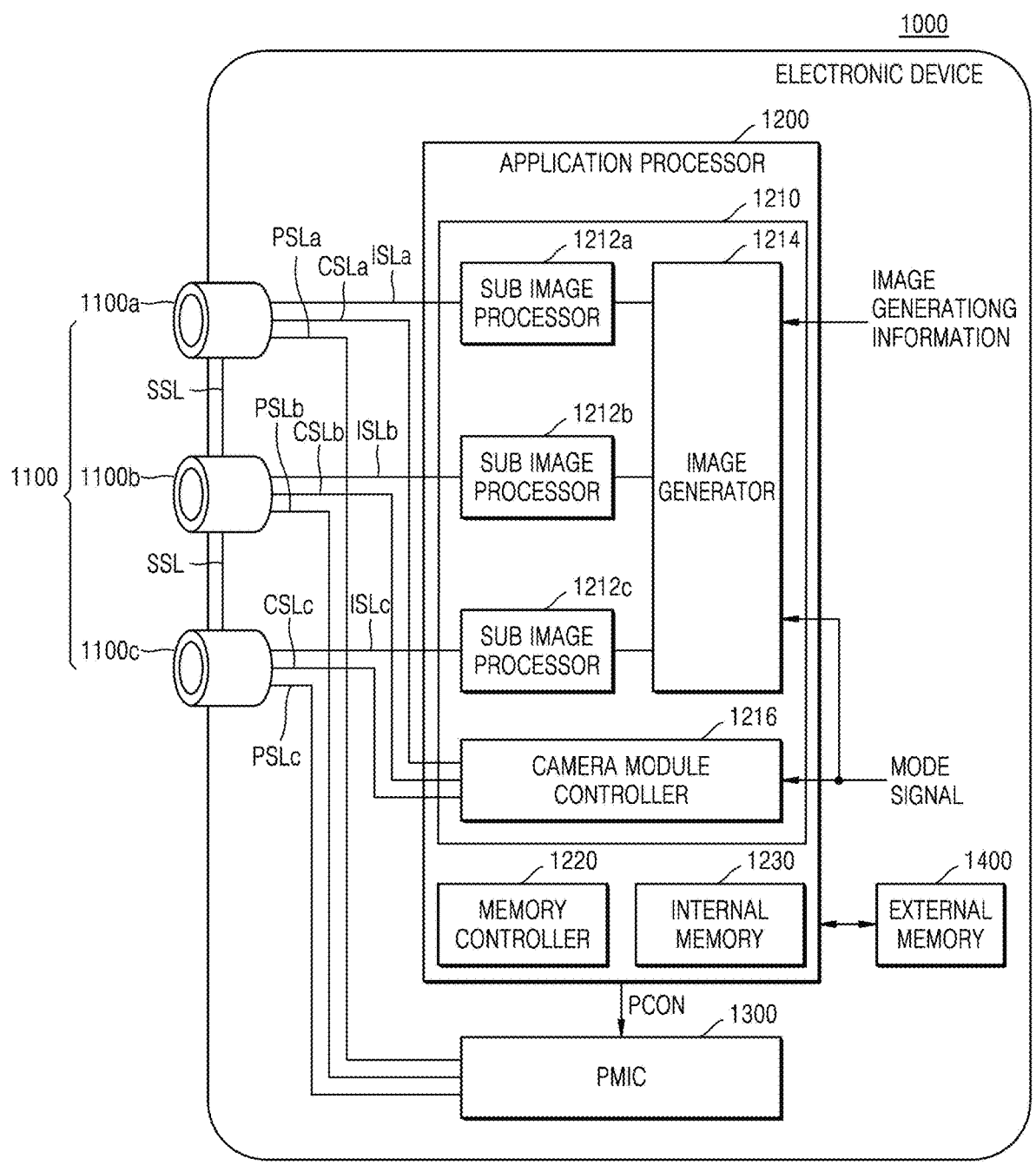
FIG. 24 is a block diagram of an electronic device including a multi-camera module.
Figure 25:
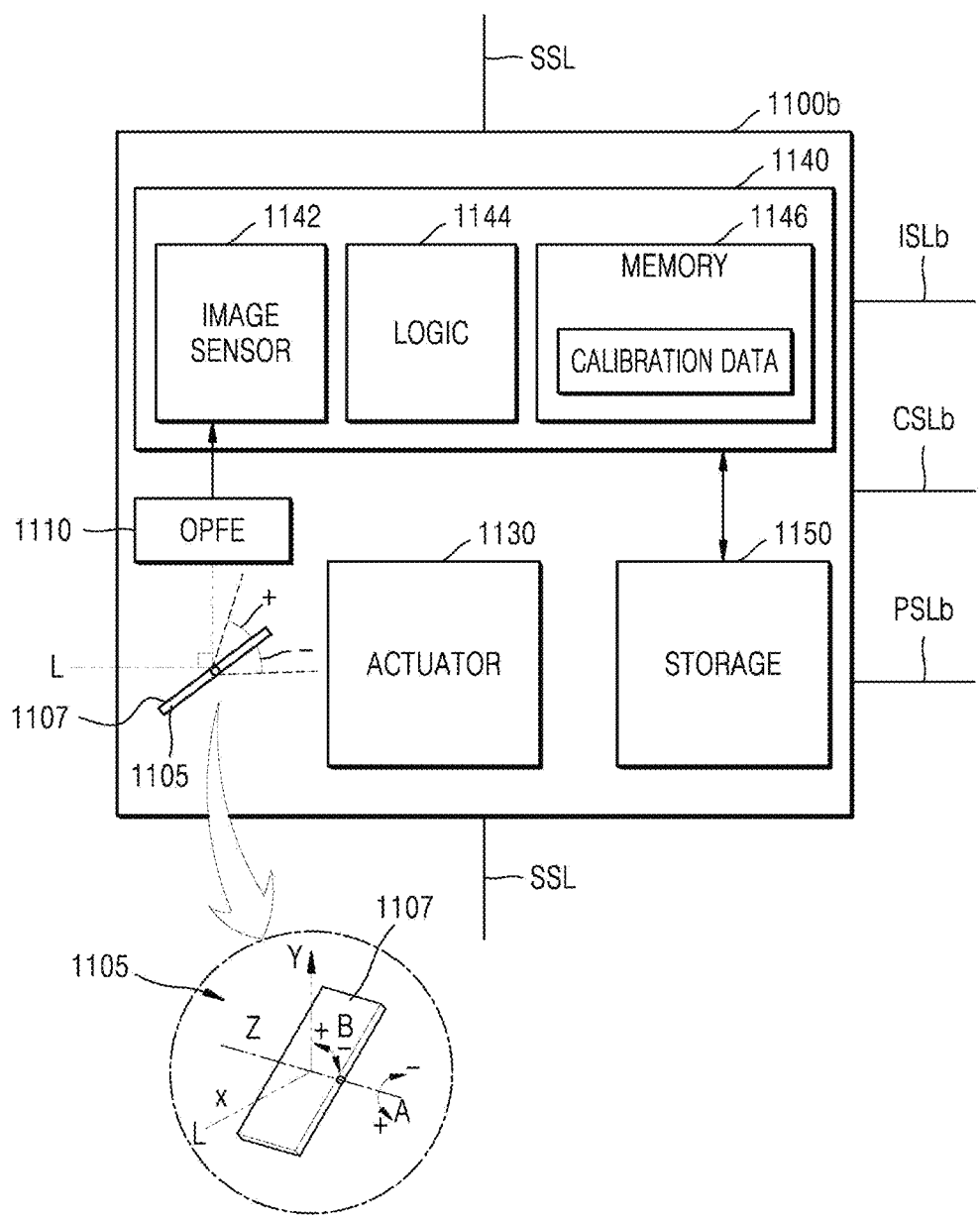
FIG. 25 is a detailed block diagram of the multi-camera module of FIG. 24.

FIG. 24 is a block diagram of an electronic device 1000 including a multi-camera module, and FIG. 25 is a detailed block diagram of the multi-camera module of FIG. 24.

Referring to FIGS. 24 and 25, the electronic device 1000 may include a camera module group 1100, an application processor 1200, a power management integrated circuit (PMIC) 1300, and an external memory 1400. The camera module group 1100 may include a plurality of camera modules 1100a, 1100b, and 1100c. Although FIG. 24 illustrates an example embodiment in which the three camera modules 1100a, 1100b, and 1100c are arranged, but example embodiments are not limited thereto.

The camera module 1100b may include a prism 1105, an optical path folding element (OPFE) 1110, an actuator 1130, an image sensing device 1140, and a storage 1150.

The prism 1105 may include a reflective surface 1107 of a light reflective material and may change the path of light L incident from the outside. The OPFE 1110 may include, for example, a group of m optical lens (where m is a natural number). The actuator 1130 may move the OPFE 1110 or the optical lens (hereinafter referred to as an optical lens) to a specific position.

The image sensing device 1140 may include an image sensor 1142, a control logic 1144, and a memory 1146. The image sensor 1142 may sense an image of a sensing object by using the light L provided through the optical lens. The control logic 1144 may control overall operations of the camera module 1100b. For example, the control logic 1144 may control the operation of the camera module 1100b according to a control signal provided through a control signal line CSLb.

In an example embodiment, one camera module (e.g., the camera module 1100b) among the camera modules 1100a, 1100b, and 1100c may be a folded-lens type camera module including the prism 1105 and the OPFE 1110, and the other camera modules (e.g., the camera modules 1100a and 1100b) may be a vertical type camera modules that do not include the prism 1105 and the OPFE 1110, but example embodiments are not limited thereto.

In an example embodiment, one camera module (e.g., the camera module 1100c) among the camera modules 1100a, 1100b, and 1100c may be a vertical type depth camera that extracts depth information by using infrared ray (IR). In this case, the application processor 1200 may generate a three-dimensional (3D) depth image by merging image data provided from the depth camera with image data provided from another camera module (e.g., the camera module 1100a or the camera module 1100b).

In an example embodiment, at least two camera modules (e.g., the camera modules 1100a and 1100b) among the camera modules 1100a, 1100b, and 1100c may respectively have different fields of view. In this case, for example, the optical lenses included in at least two camera modules (e.g., the camera modules 1100a and 1100b) among the camera modules 1100a, 1100b, and 1100c may be different from each other, but the inventive concepts are not limited thereto.

In addition, in an example embodiment, the camera modules 1100a, 1100b, and 1100c may respectively have different fields of view. In this case, the optical lenses included in the camera modules 1100a, 1100b, and 1100c may also be different from each other, but the inventive concepts are not limited thereto.

In an example embodiment, the camera modules 1100a, 1100b, and 1100c may be arranged physically apart from each other. That is, the camera modules 1100a, 1100b, and 1100c may not divide a sensing region of one image sensor 1142 for use, but an independent image sensor 1142 may be arranged in each of the camera modules 1100a, 1100b, and 1100c.

Referring again to FIG. 24, the application processor 1200 may include an image processing device 1210, a memory controller 1220, and an internal memory 1230. The application processor 1200 may be implemented separate from the camera modules 1100a, 1100b, and 1100c. For example, the application processor 1200 and the camera modules 1100a, 1100b, and 1100c may be separately implemented as individual semiconductor chips.

The image processing device 1210 may include a plurality of sub image processors 1212a, 1212b, and 1212c, an image generator 1214, and a camera module controller 1216.

The image processing device 1210 may include a number of sub image processors 1212a, 1212b, and 1212c corresponding to the number of camera modules 1100a, 1100b, and 1100c.

Image data generated by the camera modules 1100a, 1100b, and 1100c may be provided to the corresponding sub image processors 1212a, 1212b, and 1212c through image signal lines ISLa, ISLb, and ISLc separated from each other. For example, the image data generated by the camera module 1100a may be provided to the sub image processor 1212a through the image signal line ISLa, the image data generated by the camera module 1100b may be provided to the sub image processor 1212b through the image signal line ISLb, and the image data generated by the camera module 1100c may be provided to the sub image processor 1212c through the image signal line ISLc. Such image data transmission may be performed, for example, by using a mobile industry processor interface (MIPI)-based camera serial interface (CSL), but example embodiments are not limited thereto.

The image data provided to the sub image processors 1212a, 1212b, and 1212c may be provided to the image generator 1214. The image generator 1214 may generate an output image by using the image data provided from the sub image processors 1212a, 1212b, and 1212c, in response to image generating information or mode signals.

Specifically, the image generator 1214 may generate the output image by merging at least some of the image data generated by the camera modules 1100a, 1100b, and 1100c having different fields of views, in response to the image generating information or the mode signals. In addition, the image generator 1214 may generate the output image by selecting any one piece of the image data generated by the camera modules 1100a, 1100b, and 1100c having different fields of view, in response to the image generating information or the mode signals.

The camera module controller 1216 may provide a control signal to each of the camera modules 1100a, 1100b, and 1100c. The control signal generated by the camera module controller 1216 may be provided to the corresponding camera modules 1100a, 1100b, and 1100c through control signal lines CSLa, CSLb, and CSLc separated from each other.

The application processor 1200 may store the received image signal, e.g., the encoded image signal, in the internal memory 1230 inside the application processor 1200 or the external memory 1400 outside the application processor 1200, read the encoded image signal from the memory 1230 or the external memory 1400, decode the read encoded image signal, and then display image data that is generated based on the decoded image signal. For example, a corresponding sub processor among the sub image processors 1212a, 1212b, and 1212c in the image processing device 1210 may perform decoding and perform image processing on the decoded image signal.

The PMIC 1300 may provide power, for example, a power supply voltage, to each of the camera modules 1100a, 1100b, and 1100c. For example, under control of the application processor 1200, the PMIC 1300 may provide first power to the camera module 1100a through a power signal line PSLa, provide second power to the camera module 1100b through a power signal line PSLb, and provide third power to the camera module 1100c through a power signal line PSLc.

One or more of the elements disclosed above may include or be implemented in processing circuitry such as hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

While the inventive concepts have been particularly shown and described with reference to some example embodiments thereof, it will be understood that various changes in form and details may be made therein without departing from the spirit and scope of the following claims.

What is claimed is:

1. An image sensor comprising:
a substrate having a first surface and a second surface opposite to each other in a first direction; and
a pixel array comprising a plurality of pixels arranged in a second direction perpendicular to the first direction and a third direction perpendicular to the second direction,
wherein the pixel array comprises a first pixel and a second pixel adjacent to the first pixel, each of the first pixel and the second pixel being inside the substrate and comprising a pair of photodiodes,
the first pixel comprises a first pixel interior separation layer between the pair of photodiodes and extending in the first direction,
the second pixel comprises a second pixel interior separation layer between the pair of photodiodes and extending in the first direction, and
a length of the second pixel interior separation layer in the first direction is greater than a length of the first pixel interior separation layer in the first direction.

2. The image sensor of claim 1, wherein
the first pixel is closer to a central portion of the pixel array than the second pixel, and
the second pixel is farther away from a central portion of the first surface of the substrate than the first pixel.

3. The image sensor of claim 1, wherein the first pixel interior separation layer and the second pixel interior separation layer each include at least one of silicon oxide, silicon nitride, or silicon oxynitride.

4. The image sensor of claim 1, further comprising a microlens on the substrate, corresponding to the second pixel and having one surface that is convex in the first direction,
wherein a highest point of the one surface of the microlens is offset from a center of the second pixel interior separation layer in the second direction.

5. The image sensor of claim 1, further comprising a first device isolation layer between the first pixel and the second pixel,
wherein the first device isolation layer includes polysilicon.

6. The image sensor of claim 5, wherein the length of the first pixel interior separation layer in the first direction and the length of the second pixel interior separation layer in the first direction are each less than a length of the first device isolation layer in the first direction.

7. The image sensor of claim 5, further comprising a second device isolation layer extending from the first device isolation layer into the first pixel and the second pixel in the second direction and separating the pair of photodiodes of each of the first pixel and the second pixel from each other.

8. The image sensor of claim 7, wherein a width of the first pixel interior separation layer in a third direction perpendicular to the second direction is less than a width of the second device isolation layer in the third direction.

9. The image sensor of claim 7, further comprising a passivation layer surrounding the first device isolation layer and the second device isolation layer.

10. The image sensor of claim 9, wherein the passivation layer includes polysilicon doped with p-type impurities.

11. The image sensor of claim 9, wherein a length of the passivation layer in the first direction is greater than the length of the first pixel interior separation layer in the first direction and the length of the second pixel interior separation layer in the first direction.

12. An image sensor comprising:
a substrate having a first surface and a second surface opposite to each other in a first direction, the substrate comprising a pixel array comprising a plurality of pixels arranged in a second direction perpendicular to the first direction and a third direction perpendicular to the second direction, wherein
the pixel array includes
a first pixel close to a central portion of the first surface of the substrate, and
a second pixel farther away from the central portion of the first surface of the substrate than the first pixel,
the first pixel includes
a first pixel interior separation layer extending in the first direction, and
a pair of first photodiodes with the first pixel interior separation layer therebetween,
the second pixel includes a second pixel interior separation layer extending in the first direction, a pair of second photodiodes with the second pixel interior separation layer therebetween, and a length of the second pixel interior separation layer in the first direction is greater than a length of the first pixel interior separation layer in the first direction.

13. The image sensor of claim 12, wherein the first pixel interior separation layer and the second pixel interior separation layer each include at least one of silicon oxide, silicon nitride, or silicon oxynitride.

14. The image sensor of claim 12, wherein the second pixel interior separation layer overlaps a portion of at least one of the pair of second photodiodes.

15. The image sensor of claim 14, wherein the first pixel interior separation layer and the second pixel interior separation layer each extend in a direction oblique to the second direction.

16. The image sensor of claim 12, further comprising:

a first device isolation layer between the first pixel and the second pixel; and a second device isolation layer extending from the first device isolation layer into the first pixel and the second pixel in the second direction and facing each other.

17. The image sensor of claim 16, wherein a length of the first pixel interior separation layer in the first direction is less than a length of the second device isolation layer in the first direction.

18. The image sensor of claim 16, wherein a length of the second pixel interior separation layer in the first direction is less than a length of the second device isolation layer in the first direction.

19. An image sensor comprising:

a substrate having a first surface and a second surface facing each other in a first direction;

a center pixel provided inside the substrate and comprising a pair of photodiodes;

a first pixel adjacent to the center pixel and a second pixel farther away from the center pixel than the first pixel;

a plurality of microlenses on the first surface of the substrate to correspond to the first pixel and the second pixel, respectively;

a first device isolation layer between the first pixel and the second pixel and defining the first pixel and the second pixel;

a pair of second device isolation layers extending from the first device isolation layer into the first pixel and the second pixel in a second direction perpendicular to the first direction and facing each other; and a color filter between the plurality of microlenses and the first surface of the substrate, wherein the first pixel comprises a first pixel interior separation layer between the pair of photodiodes and extending in the first direction, the second pixel comprises a second pixel interior separation layer between the pair of photodiodes and extending in the first direction, a length of the second pixel interior separation layer in the first direction is greater than a length of the first pixel interior separation layer in the first direction, and a width of the first pixel interior separation layer in a third direction perpendicular to the second direction is less than a width of the second device isolation layer in the third direction.

20. The image sensor of claim 19, wherein the first pixel interior separation layer and the second pixel interior separation layer each extend in a direction oblique to the second direction, and the second pixel interior separation layer overlaps at least one of the pair of photodiodes of the second pixel in the first direction.

* * * * *